(12) United States Patent
Ohashi et al.

(10) Patent No.: US 11,996,745 B2
(45) Date of Patent: May 28, 2024

(54) COIL MOUNTING DEVICE AND COIL MOUNTING METHOD

(71) Applicant: HONDA MOTOR CO., LTD., Tokyo (JP)

(72) Inventors: Yasuto Ohashi, Tokyo (JP); Norihiko Hikima, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 17/676,831

(22) Filed: Feb. 22, 2022

(65) Prior Publication Data
US 2022/0286029 A1 Sep. 8, 2022

(30) Foreign Application Priority Data
Mar. 4, 2021 (JP) .................................. 2021-034309

(51) Int. Cl.
*H02K 15/06* (2006.01)
*H02K 1/16* (2006.01)
*H02K 15/04* (2006.01)

(52) U.S. Cl.
CPC ........... *H02K 15/066* (2013.01); *H02K 1/165* (2013.01); *H02K 15/045* (2013.01)

(58) Field of Classification Search
CPC ..... H02K 15/066; H02K 15/045; H02K 1/165
See application file for complete search history.

(56) References Cited

U.S. PATENT DOCUMENTS

2004/0207282 A1  10/2004  Toshiaki et al.
2014/0201979 A1*  7/2014  Yamaguchi .......... H02K 15/026
                                        29/596

FOREIGN PATENT DOCUMENTS

GB       649432 A  *  1/1954
JP       3982446 B2     9/2007

* cited by examiner

*Primary Examiner* — Livius R. Cazan
(74) *Attorney, Agent, or Firm* — CKC & PARTNERS CO., LLC

(57) ABSTRACT

A coil mounting device includes a stator coil, a coil winding jig that has an outer diameter smaller than an inner diameter of the stator core and winds therearound a belt-shaped coil in an annular shape, a stator core fixing jig that fixes the stator core at a predetermined position and in a predetermined posture, and a coil expansion mechanism that expands the belt-shaped coil. The coil expansion mechanism includes a holder that holds the coil winding jig inside the stator core in a state where the inter-comb-teeth grooves are matched in phase with the slots, and a coil expander that expands the belt-shaped coil by pressing a portion nearer to a side end than the straight portions of the belt-shaped coil wound around the coil winding jig held by the holder so as to expand the portion, thereby inserting the straight portions into the slots.

2 Claims, 21 Drawing Sheets

ND COIL
COIL MOUNTING DEVICE AND COIL MOUNTING METHOD

This application is based on and claims the benefit of priority from Japanese Patent Application No. 2021-034309, filed on 4 Mar. 2021, the content of which is incorporated herein by reference.

BACKGROUND OF THE INVENTION

Field of the Invention

The present invention relates to a coil mounting device and a coil mounting method.

Related Art

There has been conventionally known a method for mounting an annularly wound coil in a slot of a stator core by inserting the annularly wound coil inside the stator core and moving an in-slot accommodation portion of the coil from inside toward outside with respect to slots of the stator core (for example, see Patent Document 1).

In the above-mentioned related art, after the coil is wound around a cylindrical insertion jig having grooves on the outer periphery thereof and inserted inside the stator core, the coil wound around the insertion jig is expanded in diameter by an expanding jig.

Patent Document 1: Japanese Patent. No. 3982446

SUMMARY OF THE INVENTION

However, the above-mentioned related art discloses neither a specific device nor a specific method for inserting the coil into the slots while expanding in diameter the coil inserted inside the stator core.

An object of the present invention is to provide a coil mounting device and a coil mounting method that are capable of easily and surely inserting an annularly wound belt-shaped coil into slots from the inside of a stator core.

(1) An embodiment of the present invention is directed to a coil mounting device (for example, a coil mounting apparatus 1 described later) for mounting a belt-shaped coil (for example, a belt-shaped coil 100 described later) to a stator core (for example, a stator core 2 described later) along a circumferential direction of the stator core by inserting straight portions (for example, straight portions 102 described later) of the belt-shaped coil into slots (for example, slots 22 described later) from an inside of the stator core. The coil mounting device includes: the stator core; a coil winding jig (for example, a coil winding jig 4 described later) that has inter-comb-teeth grooves (for example, inter-comb-teeth grooves 43 described later) radially arranged on an outer periphery thereof, has an outer diameter smaller than an inner diameter of the stator core, and is configured to wind therearound the belt-shaped coil in an annular shape while the straight portions of the belt-shaped coil are inserted into the inter-comb-teeth grooves from outside; a stator core fixing jig (for example, a stator core fixing jig 3 described later) that fixes the stator core at a predetermined position and in a predetermined posture; and a coil expansion mechanism (for example, a coil expansion mechanism 5 described later) that expands the belt-shaped coil wound around the coil winding jig from inside toward outside with respect to the belt-shaped coil. The coil expansion mechanism includes a holder (for example, a holder 52 described later) that holds the coil winding jig having the belt-shaped coil wound therearound inside the stator core fixed to the stator core fixing jig in a state where the inter-comb-teeth grooves are matched in phase with the slots, and a coil expander (for example, a coil expander 53 described later) that presses, from inside toward outside with respect to the belt-shaped coil, a portion (for example, the position of a coil end portion 103 described later) of the belt-shaped coil wound around the coil winding jig held by the holder, the portion being nearer to a side end of the belt-shaped coil than the straight portions, thereby inserting the straight portions into the slots.

(2) In the coil mounting device described in the foregoing (1), the coil expander may include a plurality of piece members (for example, piece members 533 described later) arranged in an annular shape around an outer periphery of the holder, and the plurality of piece members may be configured to be inserted inside the portion nearer to the side end than the straight portions of the belt-shaped coil wound around the coil winding jig and may be configured to be moved so that the distance between the adjacent piece members is increased, whereby the plurality of piece members can expand in diameter.

(3) In the coil mounting device described in the foregoing (1) or (2), the coil expansion mechanism may include two coil expansion mechanisms respectively provided on both sides in an axial direction of the coil winding jig held inside the stator core, the two coil expansion mechanisms being movable in a direction in which the coil expansion mechanisms come into contact with the coil winding jig and in a direction in which the coil expansion mechanisms separate from the coil winding jig.

(4) An embodiment of the present invention is directed to a coil mounting method for mounting a belt-shaped coil (for example, a belt-shaped coil 100 described later) to a stator core (for example, a stator core 2 described later) along a circumferential direction of the stator core by inserting straight portions (for example, straight portions 102 described later) of the belt-shaped coil into slots (for example, slots 22 described later) from an inside of the stator core. The coil mounting method includes: a coil winding step including winding, around a coil winding jig (for example, a coil winding jig 4 described later) that has inter-comb-teeth grooves (for example, inter-comb-teeth grooves 43 described later) radially arranged on an outer periphery thereof and has an outer diameter smaller than an inner diameter of the stator core, the belt-shaped coil in an annular shape by inserting, from an outside, the straight portions into the inter-comb-teeth grooves of the coil winding jig; a coil winding jig holding step including inserting the coil winding jig having the belt-shaped coil wound therearound inside the stator core, and holding the coil winding jig in a state where the inter-comb-teeth grooves are matched in phase with the slots; and a coil expansion step including pressing, from inside to outside with respect to the belt-shaped coil, a portion (for example, coil end portions 103 described later) of the belt-shaped coil wound around the coil winding jig held, the portion being nearer to a side end of the belt-shaped coil than the straight portions, thereby inserting the straight portions into the slots of the stator core.

(5) In the coil mounting method described in the foregoing (4), the coil expansion step may include expanding the belt-shaped coil in diameter by inserting a plurality of piece members (for example, piece members 533 described later) arranged in an annular shape, inside the portion nearer to the side end than the straight portions of the belt-shaped coil wound around the coil winding jig, and moving the plurality of piece members so that the distance between the adjacent piece members is increased.

(6) In the coil mounting method described in the foregoing (4) or (5), the coil expansion step may be performed from each of both sides in an axial direction of the coil winding jig held inside the stator core.

According to the foregoing (1), the coil winding jig is held in a state where the positions of the inter-comb-teeth grooves are matched in phase with the slots of the stator core, and the portion nearer to the side end than the straight portions of the annularly wound belt-shaped coil is pressed to be expanded from inside toward outside with respect to the belt-shaped coil by the coil expansion mechanism, whereby the straight portions of the belt-shaped coil can be easily and reliably inserted into the slots from the inside of the stator core without interfering with the stator core while using the inter-comb-teeth grooves as a guide.

According to the foregoing (2), the plurality of piece members arranged in an annular shape are moved so as to expand, whereby the belt-shaped coil can be easily expanded from inside toward outside.

According to the foregoing (3), since the belt-shaped coil can be expanded from each of both sides in the axial direction of the coil winding jig, the straight portions of the belt-shaped coil can be efficiently inserted into the slots.

According to the foregoing (4), the coil winding jig is held in a state where the positions of the inter-comb-teeth grooves are matched in phase with the slots of the stator core, and the portion nearer to the side end than the straight portions of the annularly wound belt-shaped coil is pressed so as to expand from inside toward outside with respect to the belt-shaped coil, whereby the straight portions of the belt-shaped coil can be easily and reliably inserted into the slots from the inside of the stator core without interfering with the stator core while using the inter-comb-teeth grooves as a guide.

According to the foregoing (5), the plurality of piece members arranged in an annular shape are moved so as to spread, whereby the belt-shaped coil can be easily expanded from inside toward outside.

According to the foregoing (6), since the belt-shaped coil can be expanded from each of both sides in the axial direction of the coil winding jig, the straight portions of the belt-shaped coil can be efficiently inserted into the slots.

DETAILED DESCRIPTION OF THE INVENTION

Figure 1:
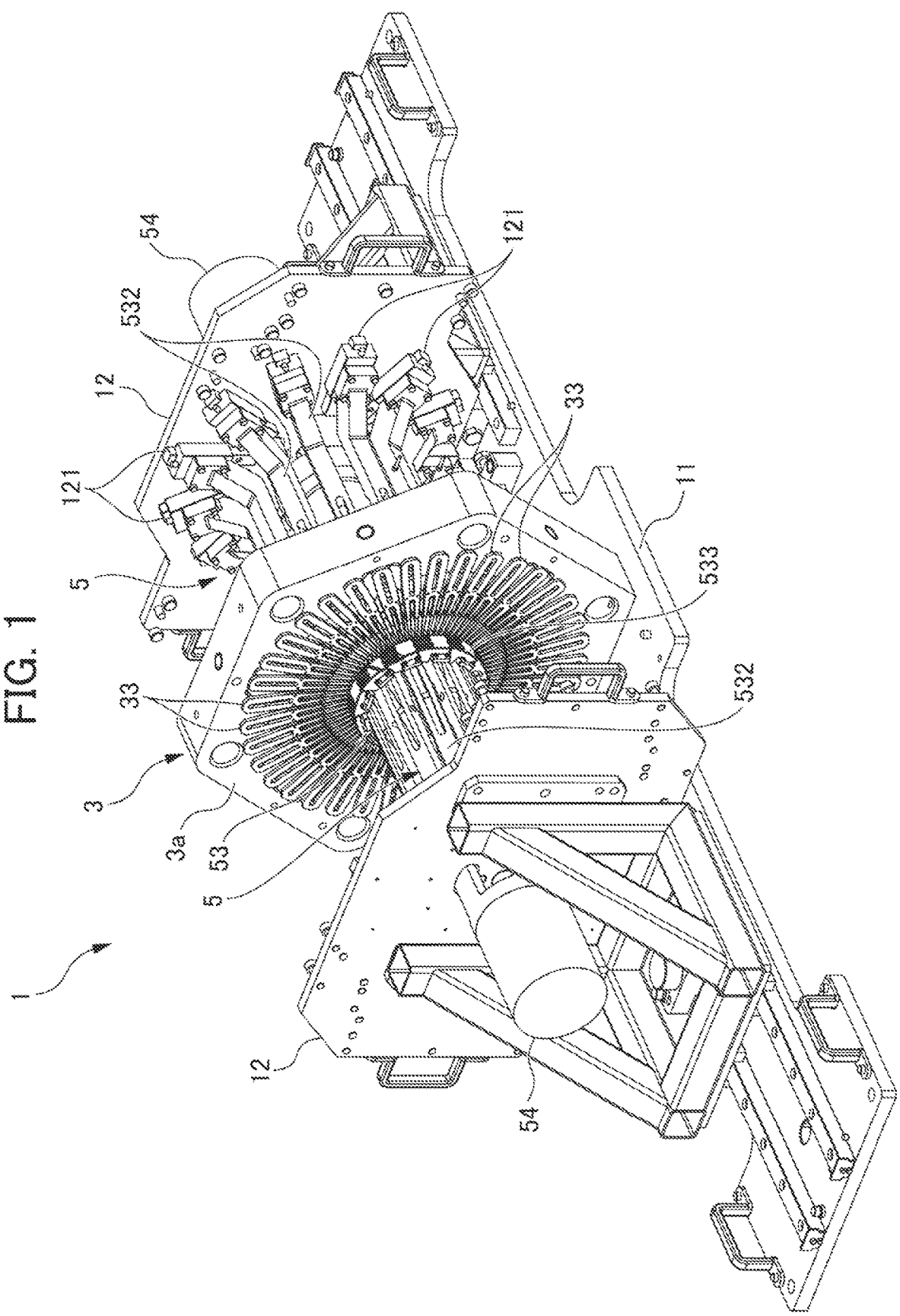
FIG. 1 is a perspective view showing a coil mounting device according to an embodiment of the present invention.
Figure 2:
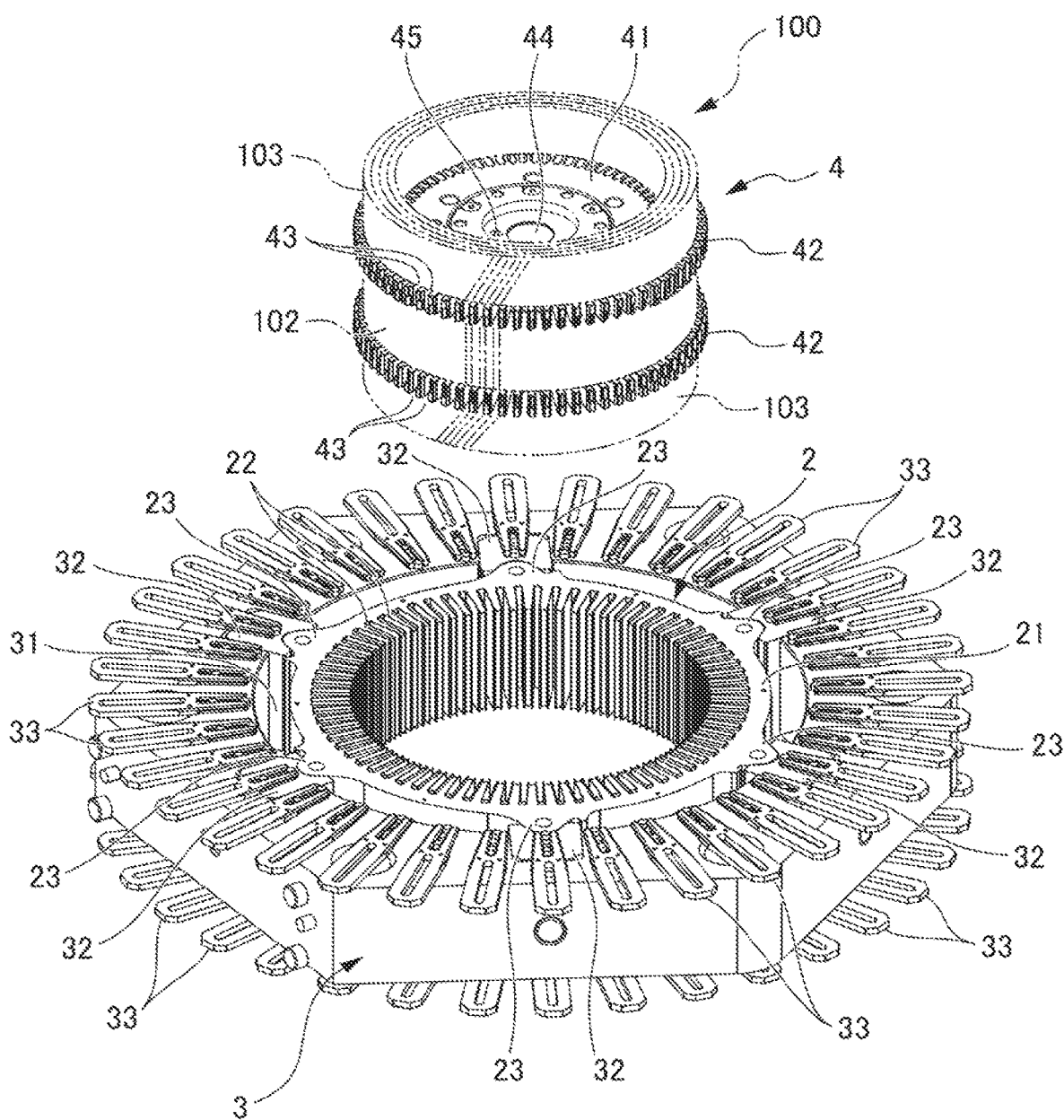
FIG. 2 is an exploded perspective view showing a stator core fixing jig having a stator core fixed thereto and a coil winding jig in a coil mounting device.

An embodiment of the present invention will be described in detail with reference to the drawings. As shown in FIGS. 1 and 2, a coil mounting apparatus 1 includes a stator core 2, a stator core fixing jig 3 for fixing the stator core 2, a coil winding jig 4 which is inserted inside the stator core 2 and winds up a belt-shaped coil 100 in an annular shape therearound, and a coil expansion mechanism 5 for expanding the belt-shaped coil 100 wound around the coil winding jig 4.

Figure 3:
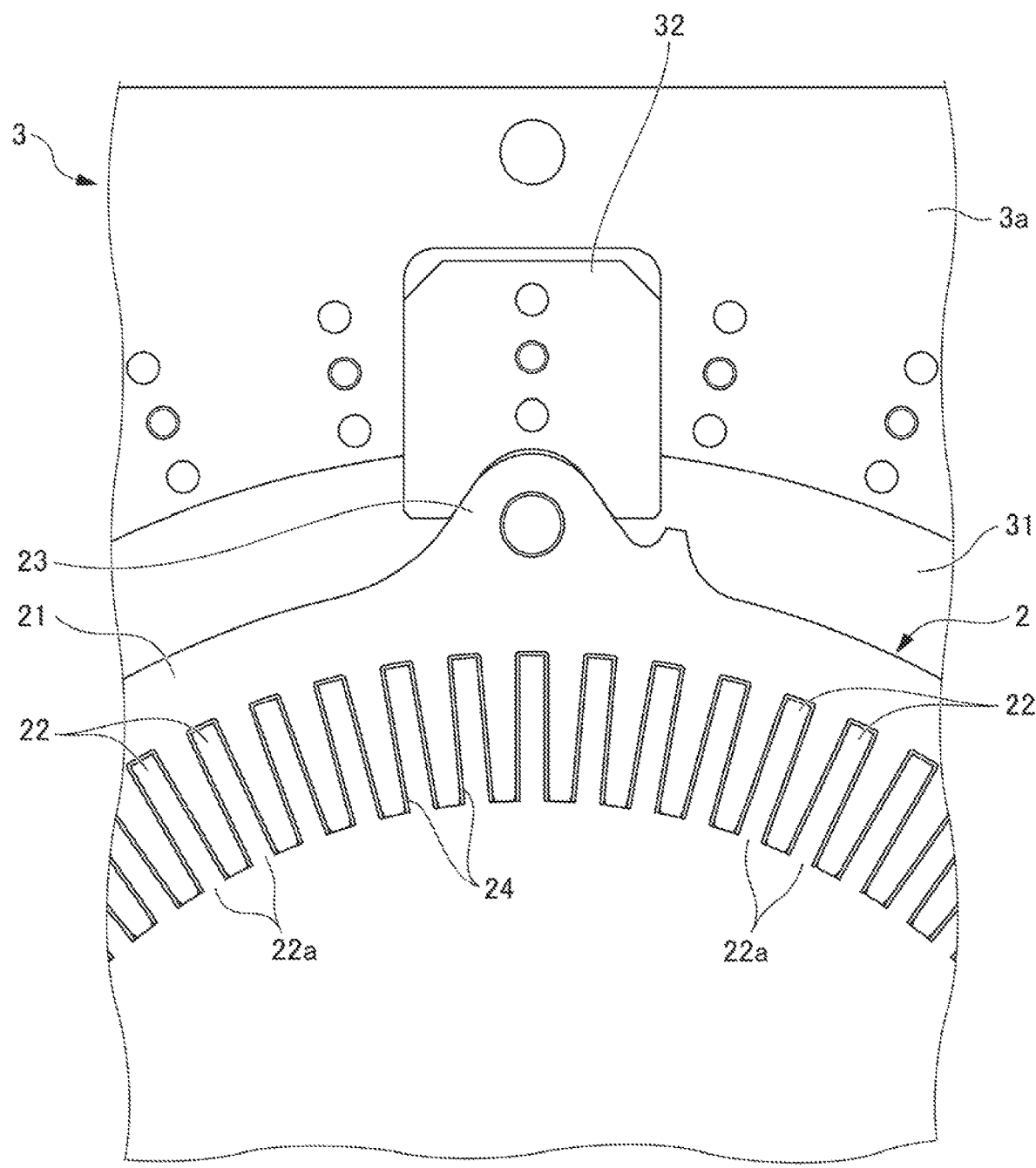
FIG. 3 is a partially enlarged view showing a fixing site of the stator core in the stator core fixing jig.

As shown in FIGS. 2 and 3, the stator core 2 includes an annular portion 21 consisting of, for example, a laminate including a plurality of thin core plates laminated together. The stator core 2 has a plurality of slots 22 penetrating therethrough in the axial direction of the stator core 2. The slots 22 are arranged radially at regular intervals in the circumferential direction of the annular portion 21, and have openings 22a that open inward in the radial direction of the annular portion 21. The stator core 2 of the present embodiment has 72 slots 22. The stator core 2 has six tabs 23 protruding at regular intervals from the outer circumference of the annular portion 21 of the stator core 2.

As shown in FIGS. 1, 2, and 3, the stator core fixing jig 3 has a hexagonal cylinder shape having an axial dimension which is substantially equal to the axial dimension of the stator core 2, and has, at the center thereof, a stator core insertion hole 31 in which the stator core 2 can be inserted and arranged. In the coil mounting apparatus 1 of the present embodiment, the stator core fixing jig 3 is fixed to a center portion of a base 11 of the coil mounting apparatus 1 so that the axial direction of the stator core 2 fixed in the stator core insertion hole 31 is parallel to the horizontal direction.

The stator core fixing jig 3 fixes the stator core 2 in the stator core insertion hole 31 at a predetermined position and in a predetermined posture. Specifically, as shown in FIGS. 2 and 3, the stator core fixing jig 3 has six core holding blocks 32 which are provided so as to correspond to the positions of the six tabs 23 of the stator core 2 and are movable so as to protrude into and retract from the inside of the stator core insertion hole 31. After the stator core 2 is inserted into the stator core insertion hole 31, the stator core fixing jig 3 causes the core holding blocks 32 to protrude into the stator core insertion hole 31 by driving an actuator such as a cylinder (not shown). As a result, as shown in FIG. 2, the core holding blocks 32 grip the tabs 23 of the stator core 2 respectively to fix the stator core 2 in the stator core insertion hole 31 at a predetermined position and in a predetermined posture.

Figure 4:
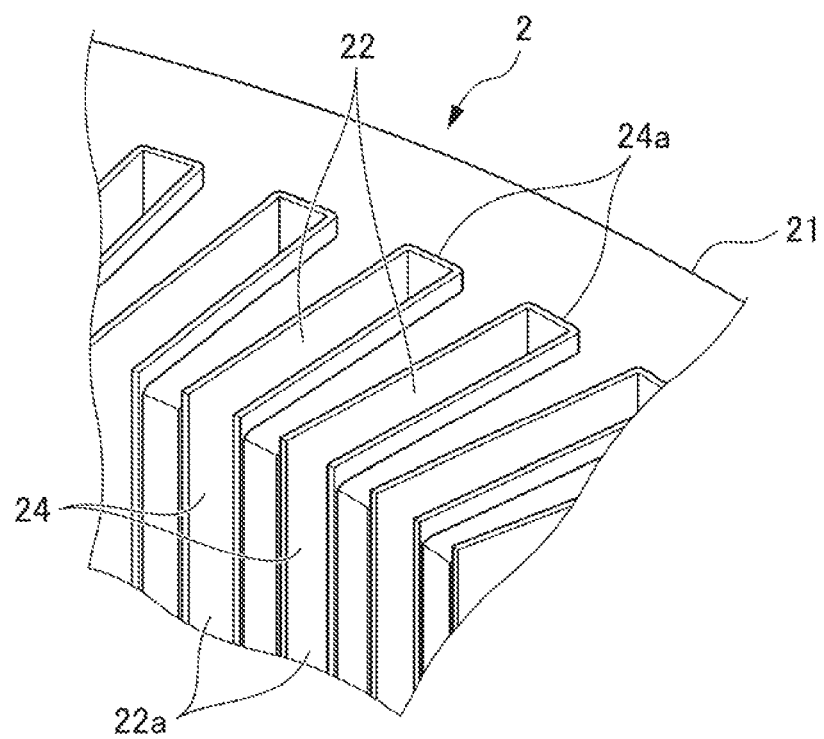
FIG. 4 is a perspective view showing insulating paper sheets disposed in slots of the stator core.

As shown in FIGS. 2 and 3, an insulating paper sheet 24 is disposed in advance in each of the slots 22 of the stator core 2. The insulating paper sheet 24 has a shape folded in a substantially U-shape so as to follow the shape of the inner surface of the slot 22 that is a substantially U-shape when the stator core 2 is viewed in the axial direction. As shown in FIG. 4, the insulating paper sheet 24 disposed in each of the slots 22 has a cuff portion 24a protruding by a predetermined height from the slot 22 in the axial direction of the stator core 2. The cuff portions 24a protrude outward from both sides of the slots 22 in the axial direction of the stator core 2.

As shown in FIG. 2, a plurality of cuff guides 33 are attached to both the axial end faces 3a, 3a of the stator core fixing jig 3 to which the stator core 2 is fixed in advance, so that the cuff guides 33 are radially arranged at regular intervals along the circumferential direction. The cuff guides 33 are provided so as to be movable along the radial direction of the stator core 2 by driving an actuator such as a cylinder (not shown). In FIG. 3, the cuff guides 33 are not illustrated in order to facilitate the understanding of the explanation of the core holding blocks 32.

Figure 5:
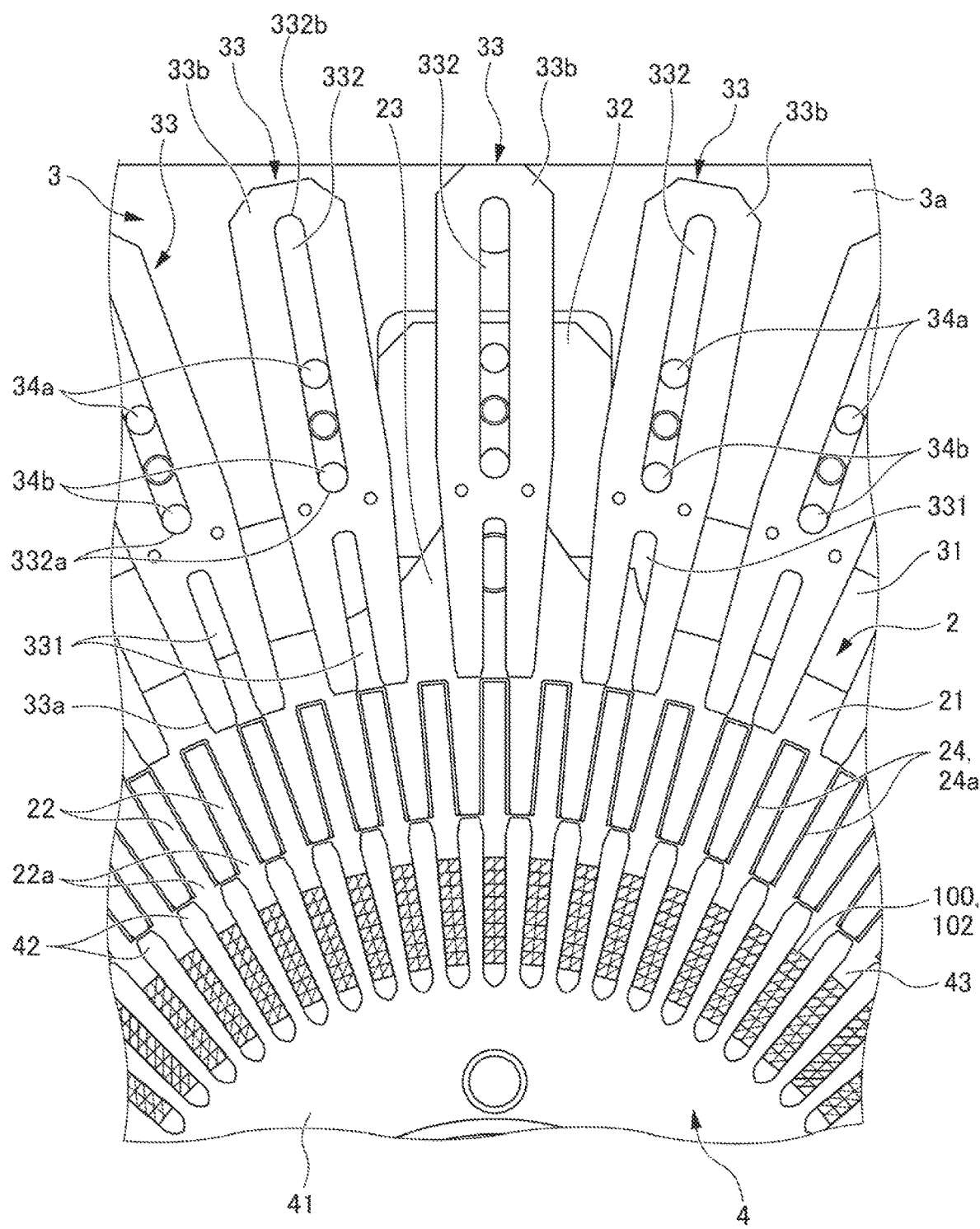
FIG. 5 is a partially enlarged view showing a state in which the slots of the stator core and the inter-comb-teeth grooves of the coil winding jig are in phase with each other.

The cuff guides 33 are formed in an elongated thin-plate shape along the radial direction of the stator core 2. As shown in FIG. 5, each cuff guides 33 has, near its inner end 33a, a guide groove 331 which opens to the inside of the stator core fixing jig 3 and supports the cuff portion 24a of the insulating paper sheet 24 from both sides. The guide groove 331 extends in the length direction of the cuff guides 33. Each guide groove 331 is a U-shaped notch having a notch width which is slightly smaller than the width of the slot 22 of the stator core 2 in the circumferential direction. Each cuff guide 33 has, near its outer end 33b that is located outside with respect to the guide groove 331, an elongated hole 332 for restricting a radial movement range of the cuff guide 33.

The stator core fixing jig 3 has, on both end faces 3a, 3a, pairs of inner diameter side restriction pins 34a and outer diameter side restriction pins 34b, such that each of the pairs corresponds to one of the cuff guides 33. The cuff guides 33 are mounted on both the end faces 3a, 3a of the stator core fixing jig 3 such that the elongated hole 332 of each cuff guide 33 has the corresponding pair of inner and outer diameter side restriction pins 34a and 34b engaged with the inside of the corresponding elongated hole 332.

As shown in FIG. 2, the inner diameter side restriction pin 34a comes into contact with the inner end portion 332a of the elongated hole 332 when the cuff guide 33 moves outward in the radial direction of the stator core fixing jig 3, whereby the cuff guide 33 is positioned at a non-guide position that is an outermost position in the radial direction. At the non-guide position, the inner end 33a of the cuff guide 33 is positioned outward with respect to the stator core insertion hole 31 in the radial direction.

The outer diameter side restricting pin 34b comes into contact with the outer end portion 332b of the elongated hole 332 when the cuff guide 33 moves inward in the radial direction of the stator core fixing jig 3, whereby the cuff guide 33 is positioned at a guide position that is an innermost position in the radial direction. At this time, the inner end 33a of the cuff guide 33 is positioned radially outside the coil winding jig 4 (see FIGS. 18 and 19).

The stator core 2 is inserted into the stator core insertion hole 31 of the stator core fixing jig 3 from either side in the axial direction. Therefore, as shown in FIG. 5, the cuff guides 33 arranged on the side opposite to the insertion side of the stator core 2 may be arranged so that the inner ends 33a of the cuff guides 33 interfere with the annular portion 21 of the stator core 2 in a state where the outer diameter side restricting pins 34b are in contact with the inner end portions 332a of the elongated holes 332. However, the inner diameter side restriction pins 34a and the outer diameter side restriction pins 34b may be configured to selectively protrude from and be recessed into the surface of the stator core fixing jig 3 by an advance-retreat mechanism (not shown) having an actuator such as a cylinder provided inside the stator core fixing jig 3. As a result, when the cuff guides 33 are arranged as shown in FIG. 5, the inner diameter side restriction pins 34a and the outer diameter side restriction pins 34b are recessed into the surface of the stator core fixing jig 3 as necessary, whereby the cuff guides 33 can be further moved outward in the radial direction so that the cuff guides 33 are completely retracted from the annular portion 21 of the stator core 2 as shown in FIG. 2.

The stator core fixing jig 3 of the present embodiment has thirty-six cuff guides 33 on each of the two faces 3a, 3a. When the cuff guides 33 are moved toward the inside of the stator core fixing jig 3 in the radial direction and positioned at guide positions, the cuff guides 33 are arranged so that the separation distance in the circumferential direction between the inner ends 33a of the adjacent cuff guides 33 coincides with the notch width of the guide groove 331.

Figure 6:
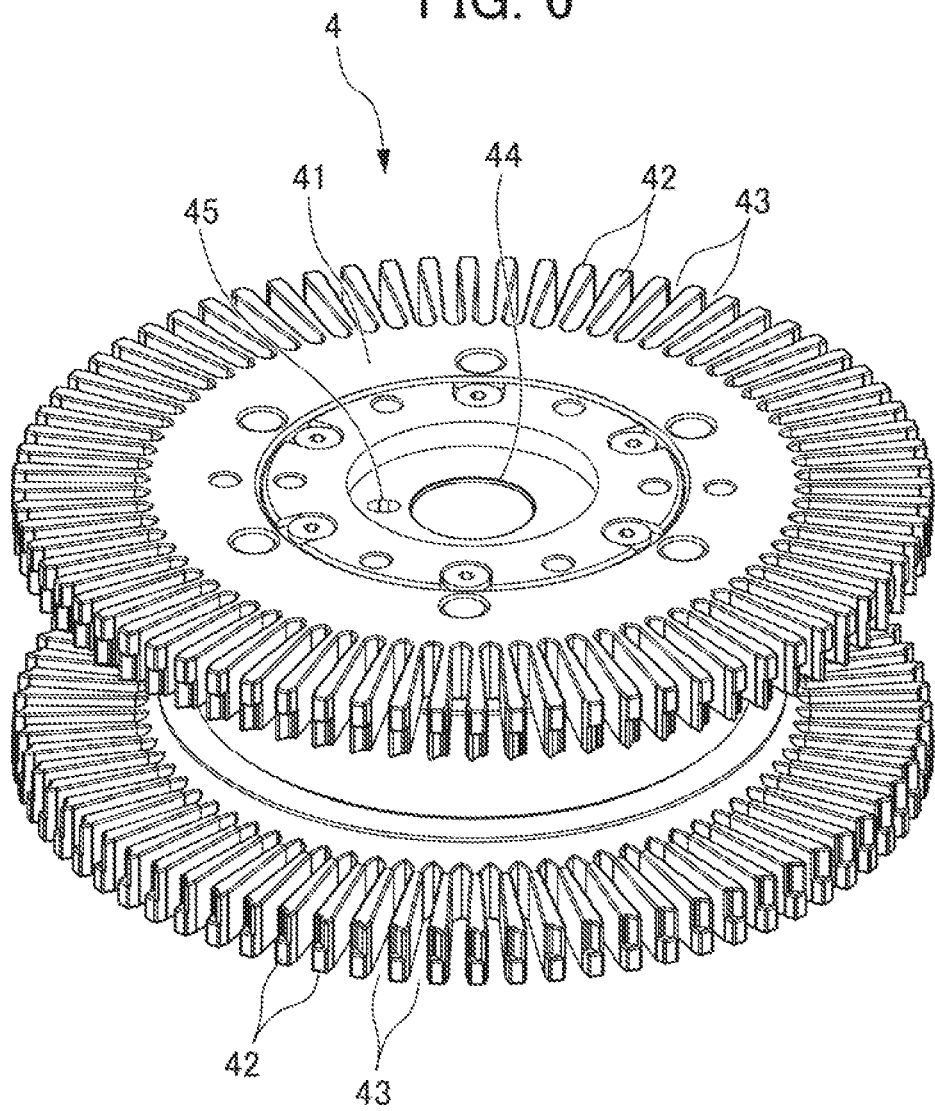
FIG. 6 is a perspective view showing a coil winding jig.

As shown in FIG. 6, the coil winding jig 4 includes a substantially cylindrical jig body 41, a plurality of comb teeth 42 radially protruding from the outer periphery of the jig body 41, and a plurality of inter-comb-teeth grooves 43 each of which is defined by the comb teeth 42 adjacent to each other in the circumferential direction, and a shaft hole 44 opened in the center of the jig body 41.

The comb teeth 42 and the inter-comb-teeth grooves 43 are provided at both axial end portions of the jig body 41. The phases of the comb teeth 42 and the inter-comb-teeth grooves 43 at both the axial end portions of the jig body 41 are aligned in the axial direction. The number of inter-comb-teeth grooves 43 arranged in the circumferential direction of the jig body 41 is the same as the number of slots 22 provided in the stator core 2. Therefore, the coil winding jig 4 of the present embodiment has seventy-two inter-comb-teeth grooves 43. The coil winding jig 4 is configured so that the outer diameter of the coil winding jig 4 defined by the positions of the tips of the comb teeth 42 is smaller than the inner diameter of the stator core 2, whereby coil winding jig 4 is insertable into the annular portion 21 of the stator core 2.

A belt-shaped coil 100 to be mounted in the stator core 2 is wound around the coil winding jig 4 in an annular shape. The belt-shaped coil 100 is an elongated belt-shaped coil which include flat conducting wires 101 having a substantially rectangular cross-sectional shape. The flat conducting wire 101 is includes a highly conductive metal, such as copper or aluminum.

Figure 7:
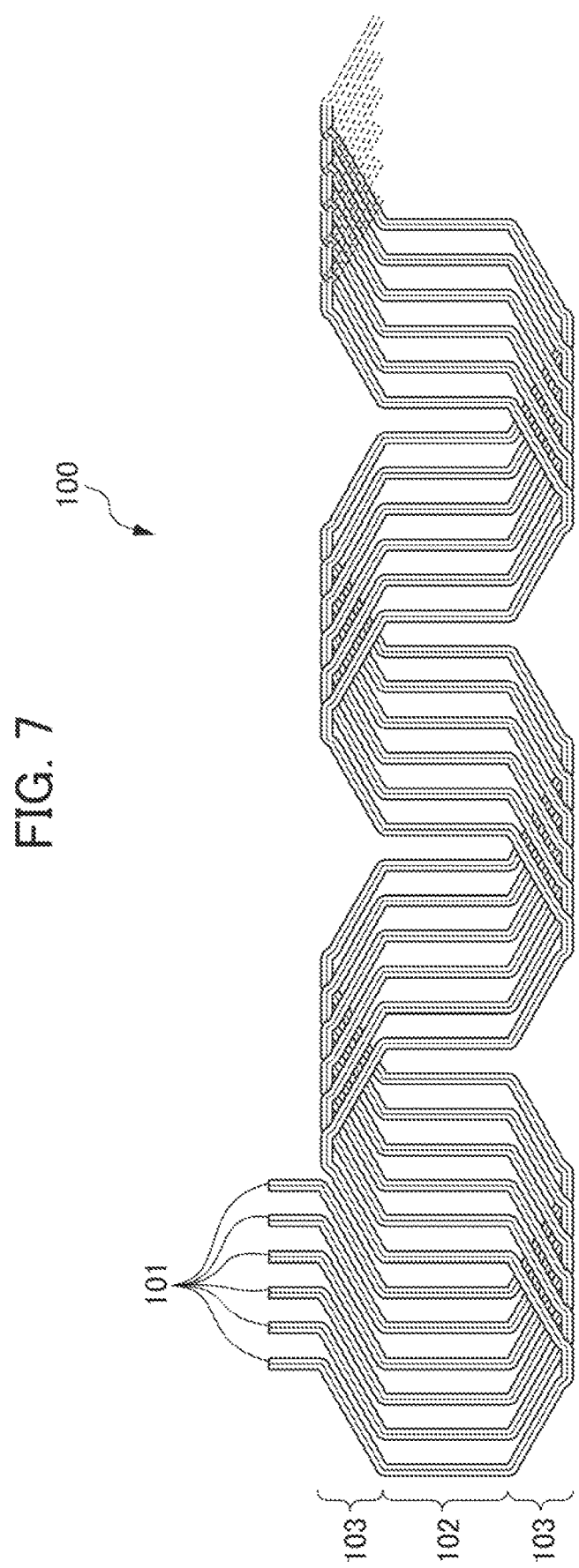
FIG. 7 is a front view showing a belt-shaped coil.

As shown in FIG. 7, the belt-shaped coil 100 has a plurality of straight portions 102 and a plurality of coil end portions 103. The straight portions 102 are sites to be inserted into the slots 22 of the stator core 2, and they extend substantially linearly and are arranged in parallel at regular intervals. The coil end portions 103 are arranged at positions nearer to the side ends of the belt-shaped coil 100 than the straight portions 102, and alternately connect end portions of adjacent straight portions 102 to each other and the opposite end portions of the adjacent straight portions 102 to each other in a substantially triangular chevron-like shape. The coil end portions 103 are sites which are arranged so as to protrude from the slots 22 in the axial direction of the stator core 2 when the belt-shaped coil 100 is mounted in the slots 22 of the stator core 2. The belt-shaped coil 100 of the present embodiment is formed in an elongated belt-shape by bundling six flat conducting wires 101 each of which is bent to have the plurality of straight portions 102 and the plurality of coil end portions 103, so that the straight portions 102 are arranged side by side in parallel at regular intervals.

Figure 8:
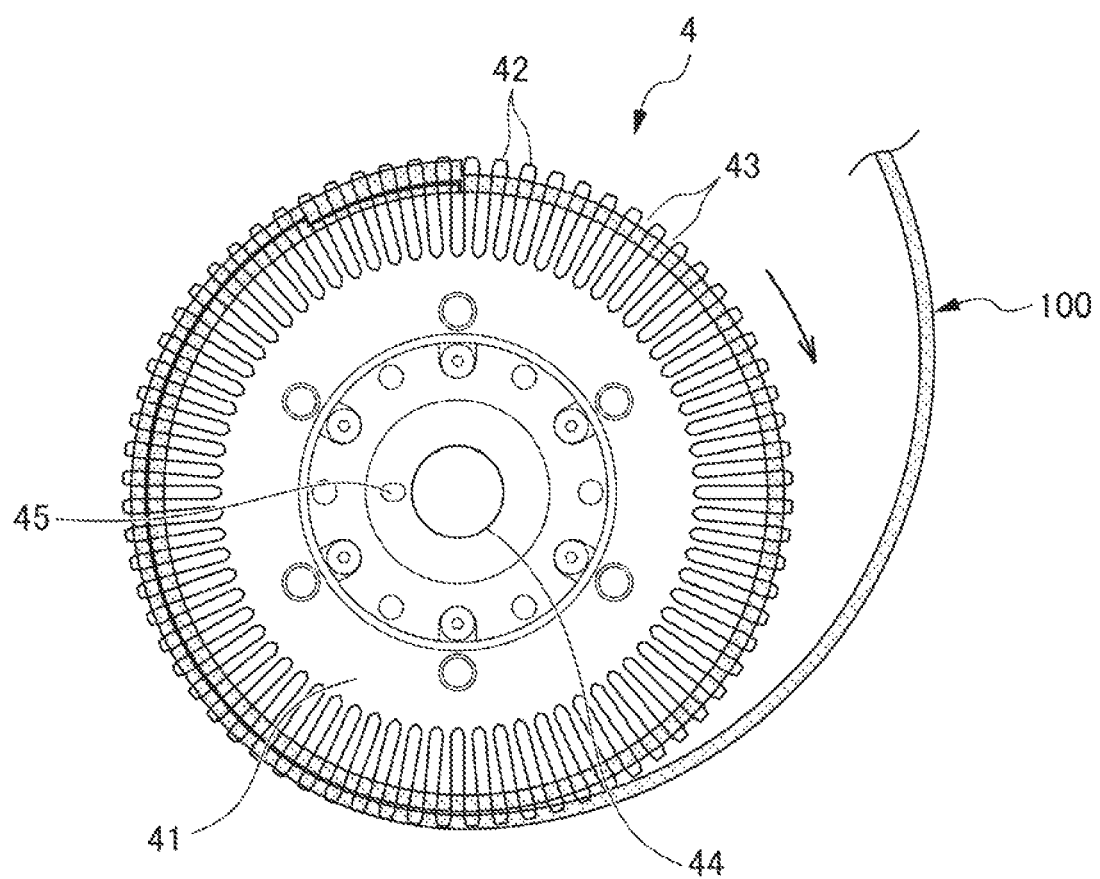
FIG. 8 is a plan view showing a state in which the belt-shaped coil is wound around the coil winding jig.
Figure 9:
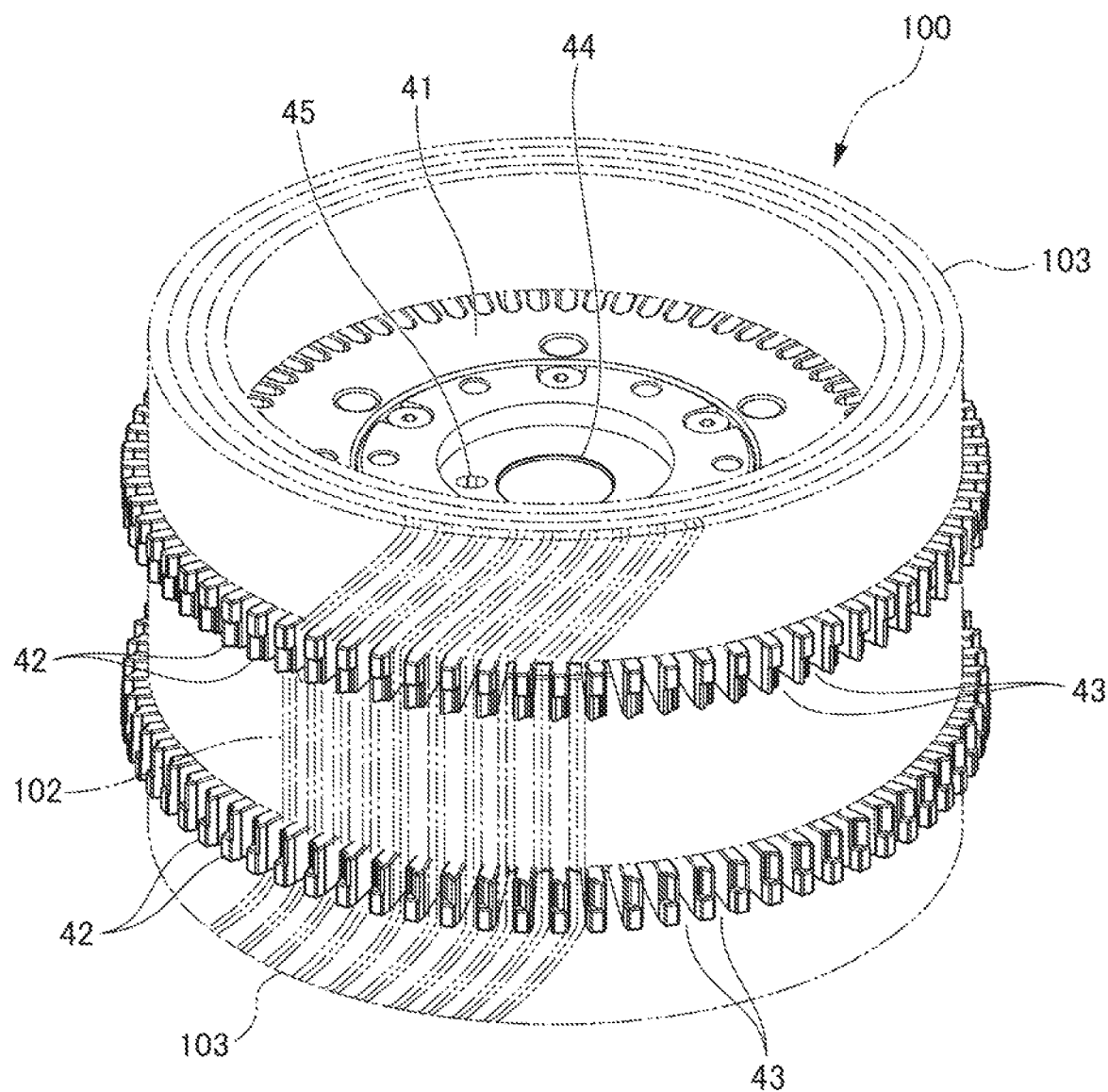
FIG. 9 is a perspective view showing the coil winding jig around which the belt-shaped coil has been wound.

As shown in FIG. 8, before the coil winding jig 4 is inserted inside the stator core 2, the straight portions 102 of the belt-shaped coil 100 are sequentially inserted into the inter-comb-teeth grooves 43 from outside, whereby the coil winding jig 4 has thereon the belt-shaped coil 100 wound by multiple turns. As a result, as shown in FIG. 9, the coil winding jig 4 on which the belt-shaped coil 100 is wound in an annular shape is prepared (coil winding step).

The inter-comb-teeth grooves 43 arranged on the coil winding jig 4 in the circumferential direction has a groove width can receive the straight portion 102 of the belt-shaped coil 100, but the groove width is slightly smaller than the opening width of the opening 22a of each slot 22 in the circumferential direction of the stator core 2.

The distance between the comb teeth 42 in the axial direction of the jig body 41 corresponds to the length of the straight portion 102 of the belt-shaped coil 100. Therefore, the straight portions 102 of the belt-shaped coil 100 wound around the coil winding jig 4 are each received to fully extend between two inter-comb-teeth grooves 43 that coincide in phase with each other and are respectively located at one end and the other end of the jig body 41. The coil end portions 103 of the belt-shaped coil 100 wound by multiple turns protrude from the inter-comb-teeth grooves 43 in the axial direction of the jig body 41 so as to form cylindrically shapes. As shown in FIGS. 1, 2 and 3, the coil winding jig 4 having thereon the belt-shaped coil 100 wound in an annular shape as described above is inserted inside the stator core 2 fixed to the stator core fixing jig 3 by, for example, a motion of a robot (not shown). FIG. 1 does not illustrate the belt-shaped coil 100 of the coil winding jig 4.

The coil winding jig 4 inserted inside the stator core 2 is held at a predetermined position and in a predetermined posture by the coil expansion mechanisms 5 that are arranged on both sides of the stator core fixing jig 3 with the stator core fixing jig 3 interposed therebetween. Each of the coil expansion mechanisms 5 is a coil expansion device. As shown in FIG. 1, the coil expansion mechanisms 5 of the present embodiment have a substantially cylindrical appearance shape, and face, in the axial direction, the coil winding jig 4 inserted inside the stator core 2.

Figure 10:
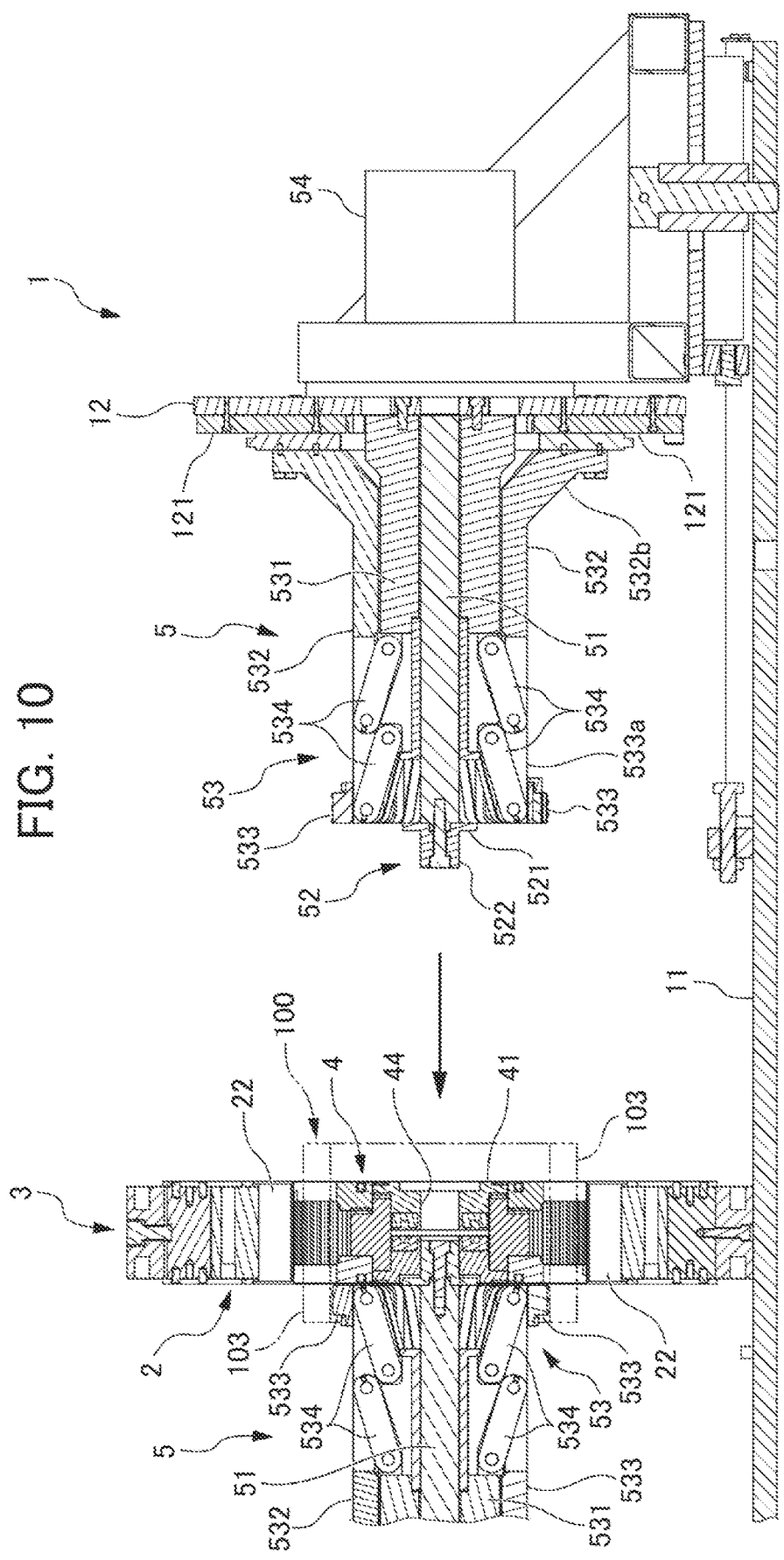
FIG. 10 is a cross-sectional side view showing an aspect in which a coil expansion mechanism is mounted on the coil winding jig inserted inside the stator core.

As shown in FIGS. 1 and 10, the coil mounting apparatus 1 include a pair of support substrates 12, 12 standing on the base 11 that fixes the positioning jig 3, so that they face each other with the positioning jig 3 disposed therebetween. Each of the coil expansion mechanisms 5 protrudes horizontally from the support board 12 toward the coil winding jig 4 inserted inside the stator core 2. The coil expansion mechanisms 5 are movable in a direction in which they come into contact with the coil winding jig 4 and in a direction in which they separate from the coil winding jig 4 when the support boards 12 are linearly moved on the base 11 by driving a motor (not shown) or the like.

Figure 11:
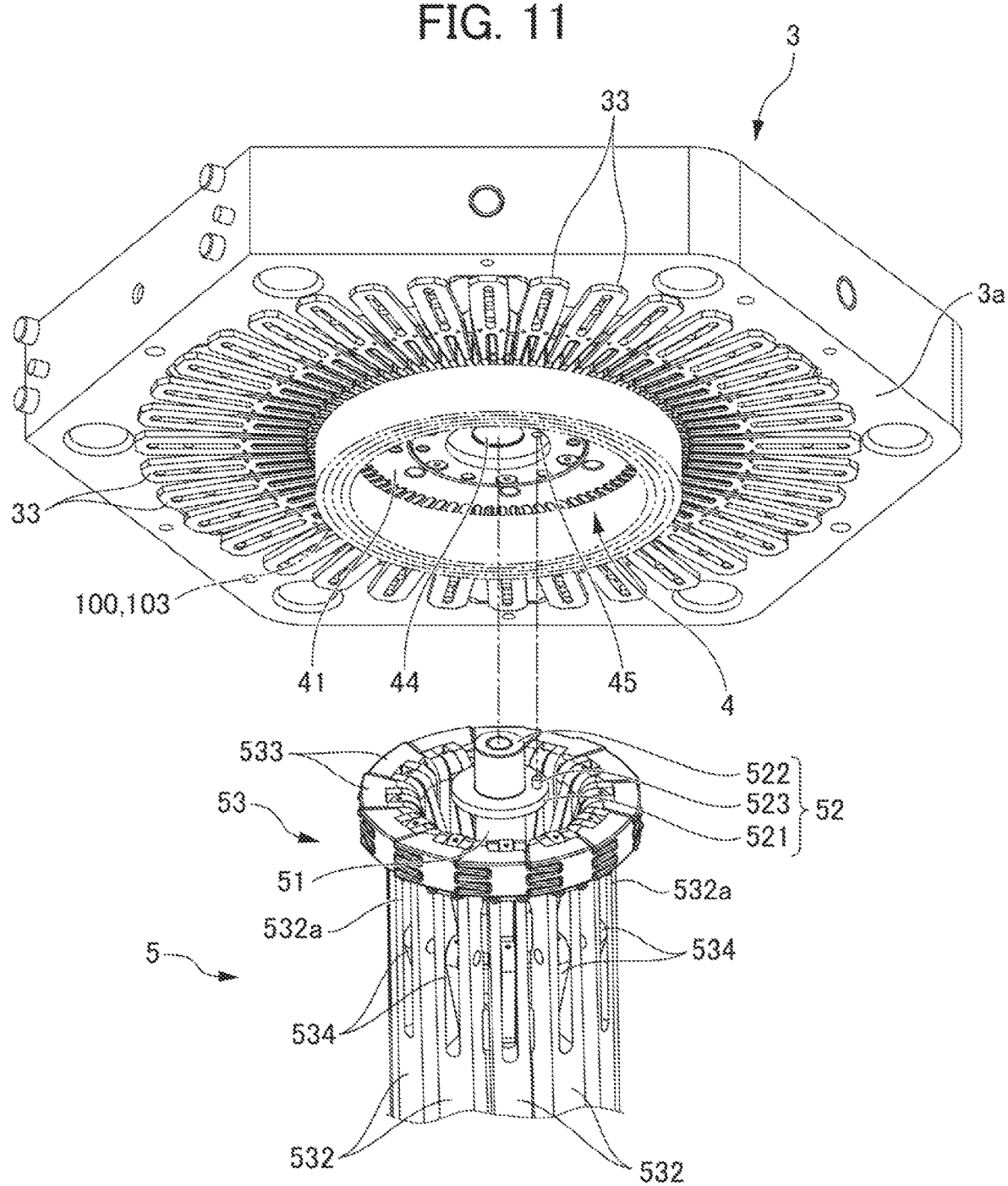
FIG. 11 is a perspective view showing the coil winding jig inserted inside the stator core and a holder of the coil expansion mechanism.

As shown in FIGS. 10 and 11, the coil expansion mechanism 5 has, in the center thereof, a main shaft 51 extending from the support board 12 toward the coil winding jig 4 inserted inside the stator core 2. The main shaft 51 has, at its leading end, a holder 52 for holding the coil winding jig 4 at a predetermined position and in a predetermined posture inside the stator core 2. The holder 52 has a circular end plate 521 disposed at the leading end of the main shaft 51, a shaft protrusion 522 protruding from the center of the circular end plate 521, and one positioning protrusion 523 protruding in the same direction as the shaft protrusion 522 from a portion of the end plate 521 that is located radially outside with respect to the shaft protrusion 522. The shaft protrusion 522 fits into the shaft hole 44 of the coil winding jig 4. The positioning protrusion 523 fits into one positioning hole 45 provided in a portion of the coil winding jig 4 that is radially outside of the shaft hole 44.

The positioning hole 45 of the coil winding jig 4 and the positioning protrusion 523 of the holder 52 are positioned in advance so that the phase of the slots 22 of the stator core 2 to be fixed to the stator core fixing jig 3 and the phase of the inter-comb-teeth grooves 43 of the coil winding jig 4 inserted inside the stator core 2 match each other when the positioning hole 45 of the coil winding jig 4 and the positioning protrusion 523 of the holder 52 are fitted to each other. Therefore, when the coil expansion mechanism 5 is moved to the stator core fixing jig 3 and the shaft protrusion 522 and the positioning protrusion 523 of the holder 52 are fitted into the shaft hole 44 and the positioning hole 45 of the coil winding jig 4 respectively, as shown in FIG. 5, the coil winding jig 4 is held while the inter-comb-teeth grooves 43 are matched in phase with the slots 22 of the stator core 2. As a result, the inside of each slot 22 of the stator core 2 and the inside of the corresponding inter-comb-teeth groove 43 of the coil winding jig 4 communicate with each other in the radial direction.

The coil expansion mechanism 5 has a coil expander 53 surrounding the outer periphery the main shaft 51. The coil expander 53 includes a movable cylinder 531 that fits onto the outer periphery of the main shaft 51, a plurality of movable arms 532 that are arranged further outside the movable cylinder 531, and a plurality of piece members 533 provided at the tips of the movable arms 532 on a one-to-one basis.

The movable cylinder 531 is smaller in length than the main shaft 51, and is slidable in the axial direction of the main shaft 51 by driving an actuator 54, such as a cylinder, arranged behind the support board 12.

The plurality of movable arms 532 extend in the axial direction of the main shaft 51, and are arranged around the outer periphery of the movable cylinder 531 at regular intervals in the circumferential direction. The coil expander 53 of the present embodiment has twelve movable arms 532 arranged along the circumferential direction of the main shaft 51. The support board 12 has, on its surface, twelve guide rails 121 extending radially outward and arranged in the radial direction with the main shaft 51 centered. Rear ends 532b of the movable arms 532 are attached so as to be movable along the guide rails 121. The movable arms 532 bend from the guide rails along the axial direction of the movable cylinder 531 and extend to the vicinity of the outer periphery of the holder 52. The tips 532a of the movable arms 532 are connected to the outer peripheral surface on the tip portion of the movable cylinder 531 via every two link portions 534 which are rotatably attached.

Figure 13:
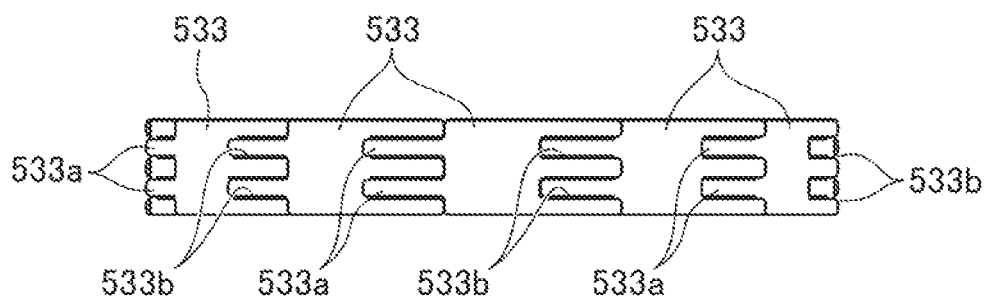
FIG. 13 is a side view showing the coil expander of the coil expansion mechanism in the diameter-reduced state.
Figure 14:
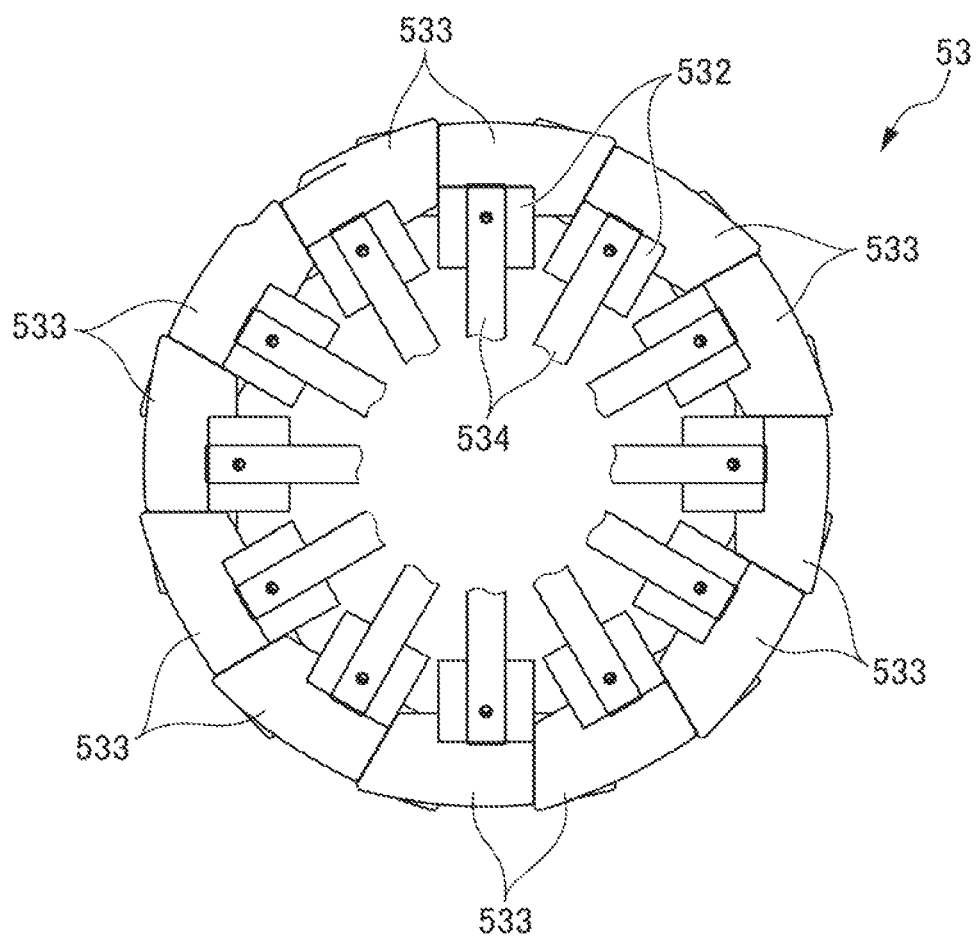
FIG. 14 is a front view showing the coil expander of the coil expansion mechanism in the diameter-reduced state.

The piece members 533 have a substantially fan shape, and are provided to the tips of the movable arms 532 on a one-to-one basis. Therefore, the coil expander 53 of the present embodiment has twelve piece members 533. As shown in FIGS. 13 and 14, each of the piece members 533 has a pair of fitting projections 533a at one end portion thereof in the circumferential direction, and a pair of fitting grooves 533b that are fittable to the fitting projections 533a, at the other end thereof in the circumferential direction. The pair of engagement protrusions 533a are adjacent in the axial direction of the coil expansion portion 53, and protrudes in parallel toward the circumferential direction of the coil expansion portion 533. The twelve piece members 533 are annularly arranged around the outer periphery of the holder 52 in such a manner that adjacent piece members 533, 533 engage with each other via the pair of fitting projections and the pair of fitting grooves 533b thereof.

Figure 12:
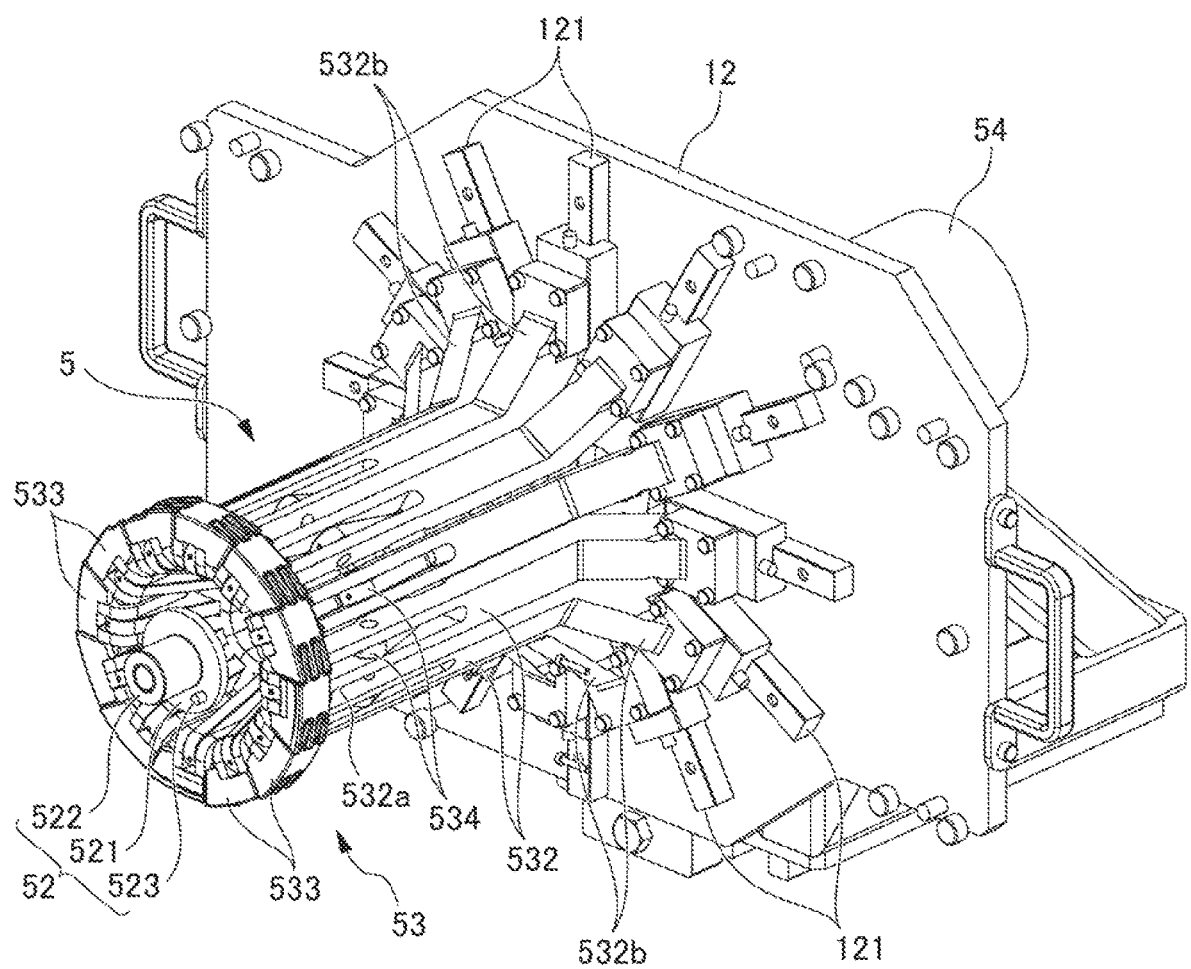
FIG. 12 is a perspective view showing the coil expansion mechanism in a diameter-reduced state.

The coil expander 53 of the coil expansion mechanism 5 shown in FIGS. 10, 11 and 12 is in a state in which the movable cylinder 531 is retracted toward a rear end of the main shaft 51 (toward the support board 12). At this time, the movable arms 532 move toward the inner ends of the radial guide rails 121, and are positioned closest to the outer peripheral surface of the movable cylinder 531. As a result, as shown in FIGS. 13 and 14, the coil expander 53 is minimized in diameter so that the twelve piece members 533 are brought into tight contact with one another. When minimized, the outer diameter of the coil expander 53 is slightly smaller than the inner diameter of the cylindrical shape formed by the coil end portion 103 protruding in the axial direction from the coil winding jig 4 having the belt-shaped coil 100 wound therearound. While the coil expander 53 is reduced in diameter, the coil expansion mechanism 5 is inserted in the coil end portions 103 forming the cylindrical shape by protruding in the axial direction of the coil winding jig 4, and holds the coil winding jig 4 by the holder 52.

Figure 15:
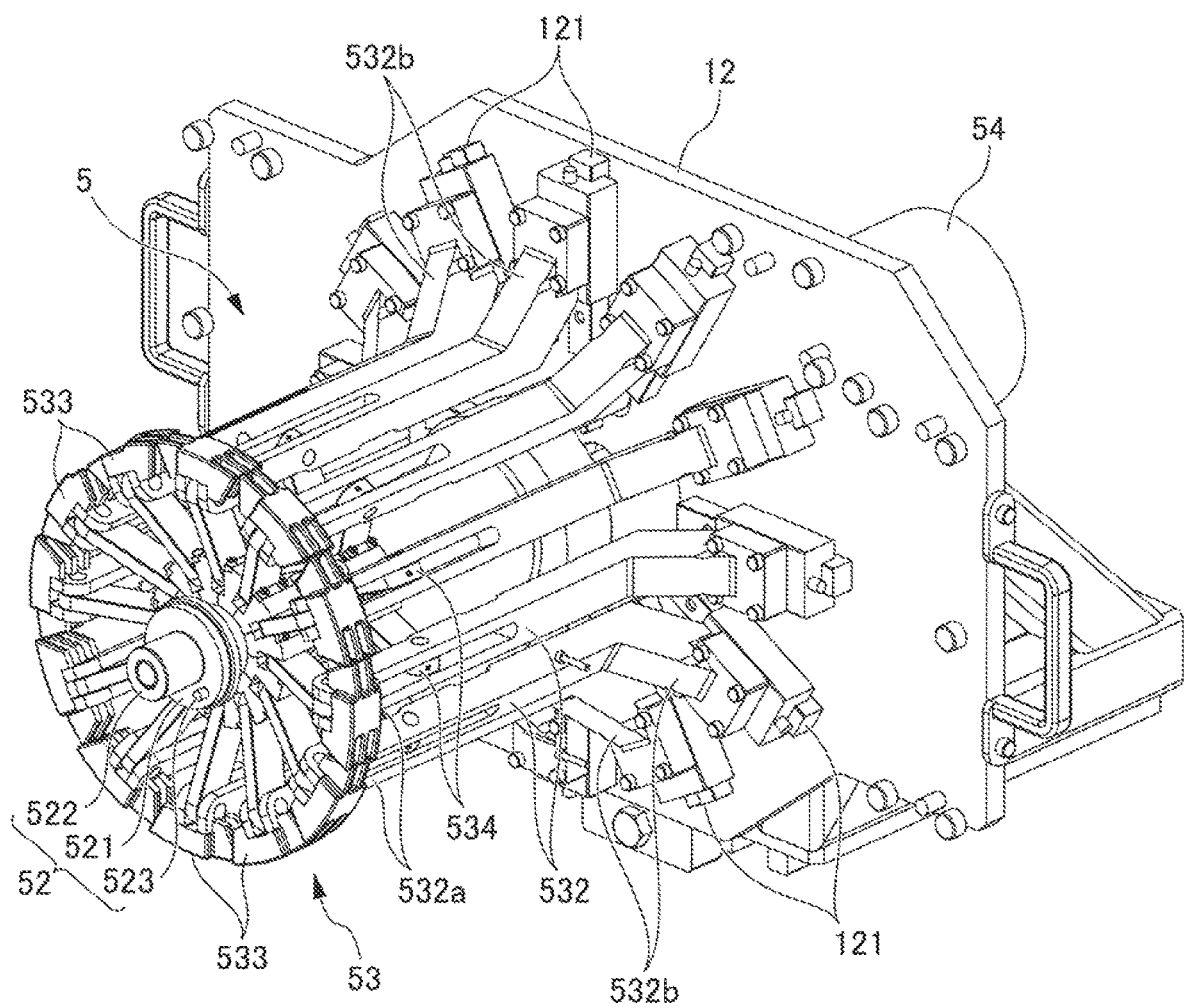
FIG. 15 is a perspective view showing the coil expansion mechanism in a diameter-increased state.
Figure 16:
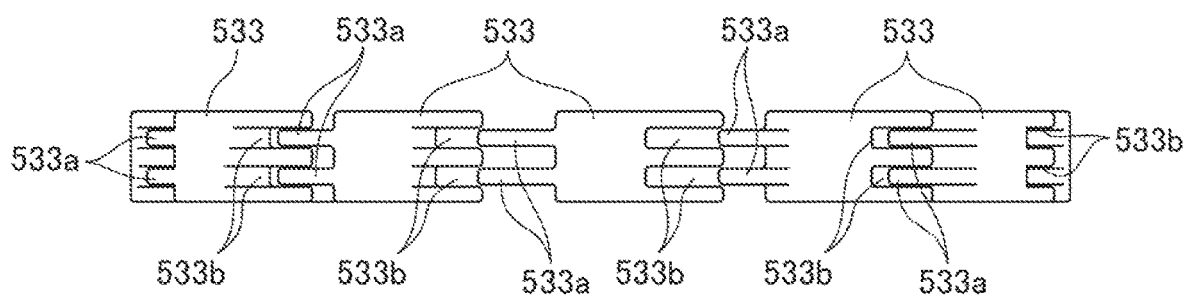
FIG. 16 is a side view showing the coil expander of the coil expansion mechanism in the diameter-increased state.
Figure 17:
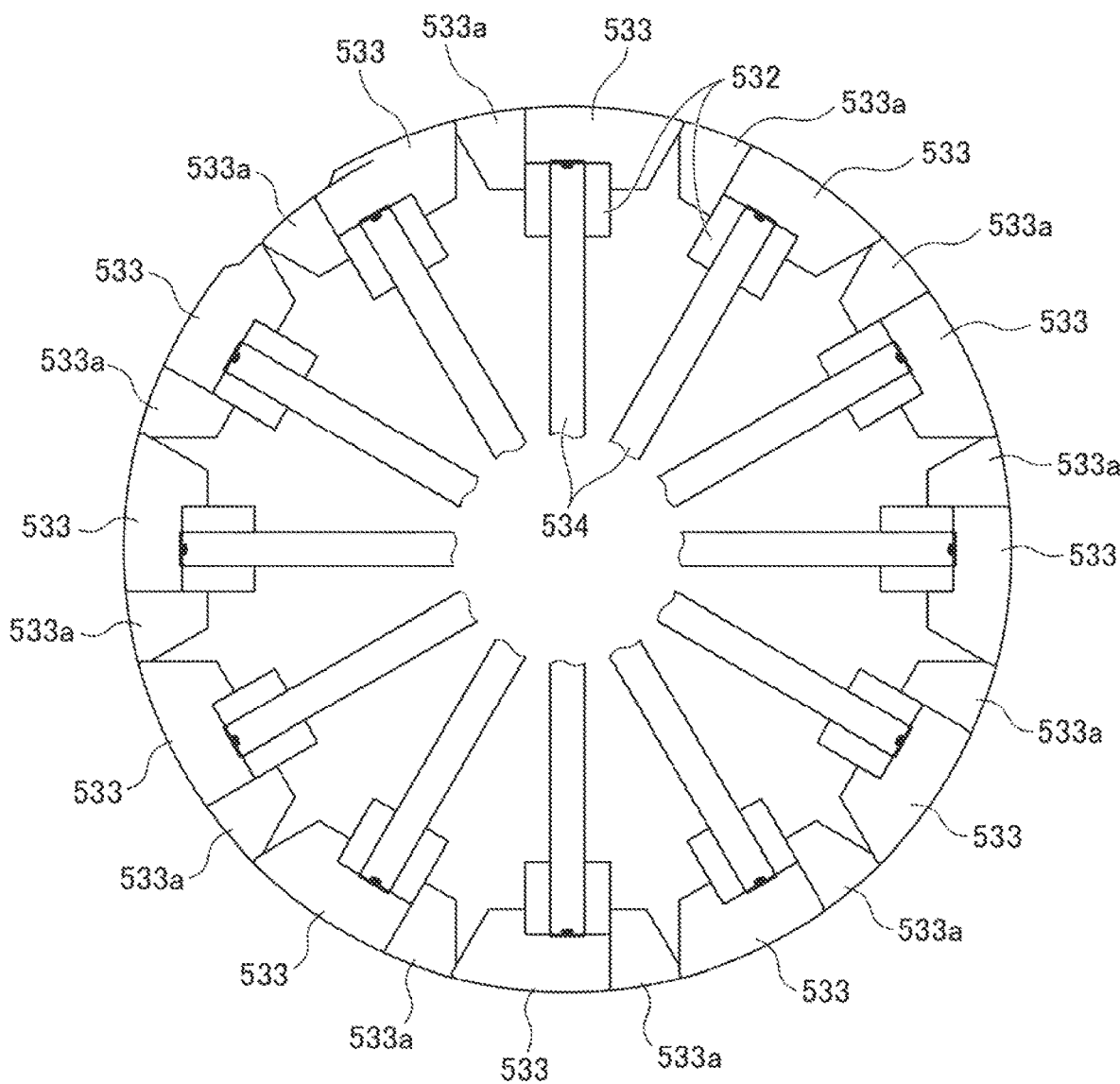
FIG. 17 is a front view showing the coil expander of the coil expansion mechanism in the diameter-increased state.

Next, when the movable cylinder 531 advances toward the coil winding jig 4 along the main shaft 51 by driving the actuator 54, the link portions 534 connected to the movable cylinder 531 are turned so as to protrude radially outward with respect the movable cylinder 531, thereby translating the movable arms 532 outwardly along the guide rails. As a result, the twelve movable arms 532 are separated radially outward from the movable cylinder 531. At this time, as shown in FIGS. 15, 16 and 17, the coil expander 53 expands in diameter by moving the piece members 533 so that the distance between the adjacent piece members 533 increases. When maximized, the outer diameter of the coil expander 53 is slightly larger than the outer diameter of the coil winding jig 4.

As shown in FIGS. 16 and 17, when the coil expander 53 is most expanded in diameter, the adjacent piece members 533, 533 are separated from each other, while each pair of fitting projections 533a separated from the fitting grooves 533b protrude in the circumferential direction between the piece members 533, 533. Therefore, when the coil expander 53 is viewed in the circumferential direction, the adjacent piece members 533, 533 are continuous with each other via the pair of fitting projections 533a, and such a groove portion as to penetrate through the coil expander 53 in the radial direction is not formed.

Next, a method for inserting the belt-shaped coil 100 wound around the coil winding jig 4 into the slots 22 from the inside of the stator core 2 fixed to the stator core fixing jig 3, while using the coil mounting apparatus 1 will be described.

Figure 18:
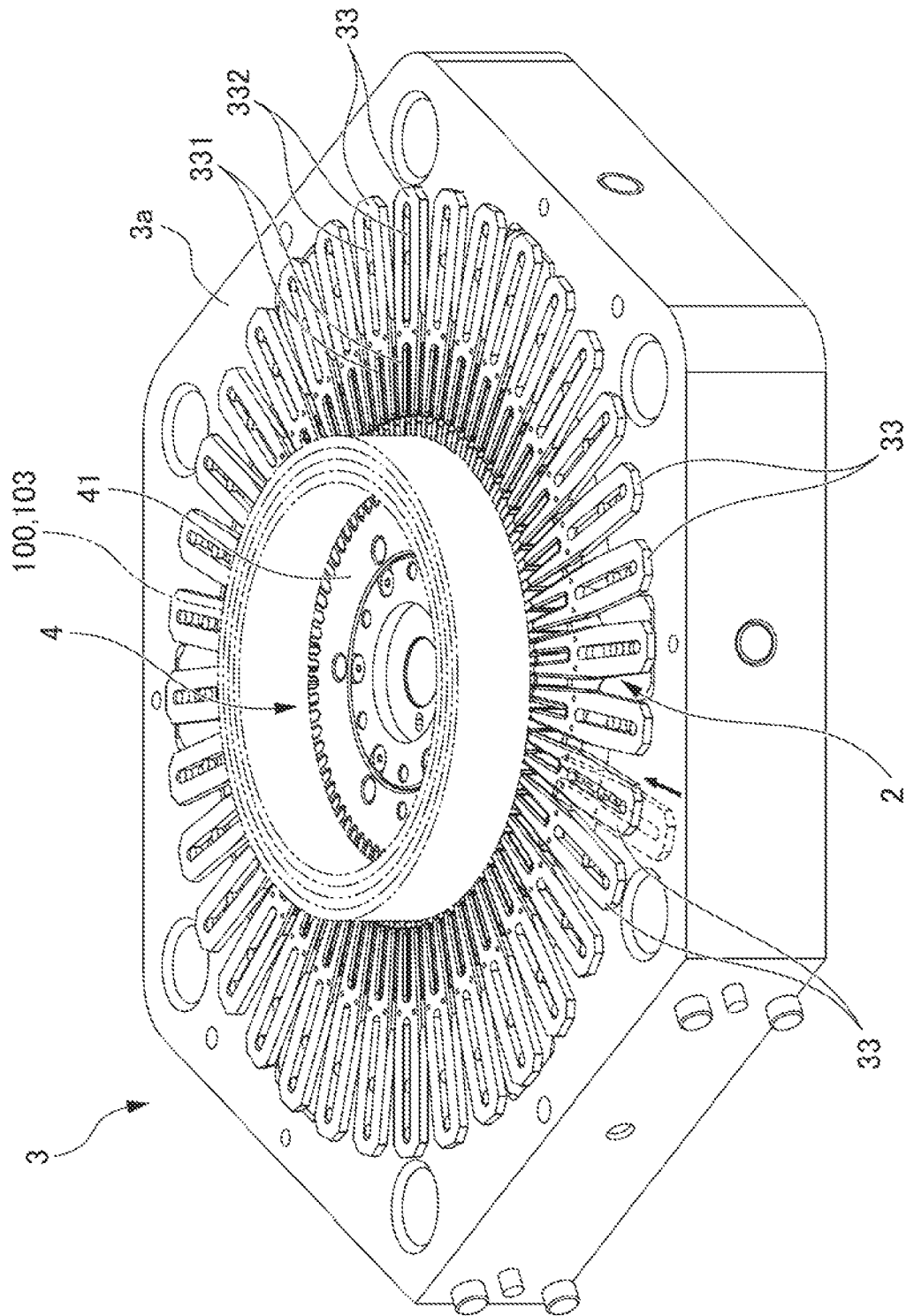
FIG. 18 is a perspective view showing a state in which insulating paper sheets in the slots of the stator core are supported by cuff guides.

Before insertion of the coil winding jig 4 into the stator core 2, the coil winding step described above is performed so that the belt-shaped coil 100 is annularly wound around the coil winding jig 4. After the coil winding jig 4 having the belt-shaped coil 100 annularly wound therearound is inserted inside the stator core 2 fixed to the stator core fixing jig 3, the cuff guides 33 are moved inward in the radial direction by driving an actuator (not shown), as shown in FIG. 18.

Figure 19:
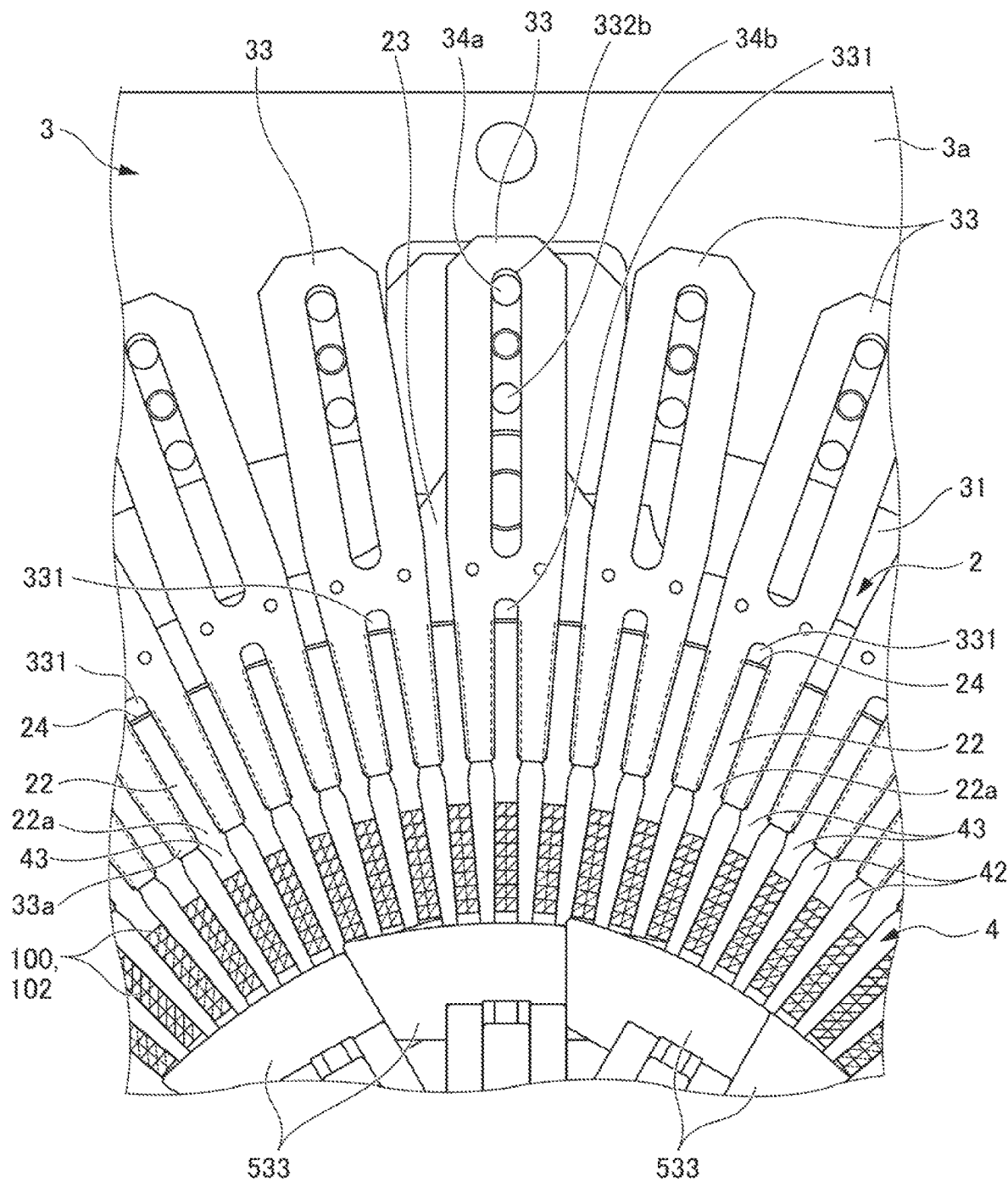
FIG. 19 is a partially enlarged view showing a state in which the insulating paper sheets in the slots of the stator core are supported by the cuff guides.

In a state where the cuff guides 33 have been moved inward in the radial direction, as shown in FIG. 19, the guide grooves 331 of the cuff guides 33 support the cuff portions 24a of the insulating paper sheets 24 in the corresponding slots 22 from both sides in the circumferential direction. At this time, just like the guide grooves 331, the inner ends 33a, 33a of the cuff guides 33, 33 adjacent to each other in the circumferential direction also support the cuff portion 24a of the insulating paper sheet 24 in the slot 22 between the cuff guides 33, 33 from both sides in the circumferential direction. Since the notch width of each guide groove 331 and the separation distance between the inner ends 33a, 33a of the adjacent cuff guides 33, 33 are slightly smaller than the width of the slot 22 in the circumferential direction, the insulating paper sheet 24 whose cuff portion 24a is supported from both sides by the guide groove 331 and the insulating paper sheet 24 whose cuff portion 24a is supported from both sides by the adjacent cuff guides 33, 33 are positioned at a predetermined position in the respective slots 22.

Although the coil expansion mechanism 5 that holds the coil winding jig 4 is not shown in FIG. 18, the operation that causes the cuff guides 33 to support the cuff portions 24a is performed at an appropriate timing after the stator core 2 is fixed to the stator core fixing jig 3 and before the belt-shaped coil 100 is inserted into the slots 22 of the stator core 2 by way of an operation of the coil expander 53, as will be described later.

Each coil expansion mechanism 5 having the coil expander 53 reduced in diameter moves toward the coil winding jig 4, whereby the coil winding jig 4 inserted inside the stator core 2 is held by the holder 52 of the coil expansion mechanism 5 (coil winding jig holding step).

Figure 20:
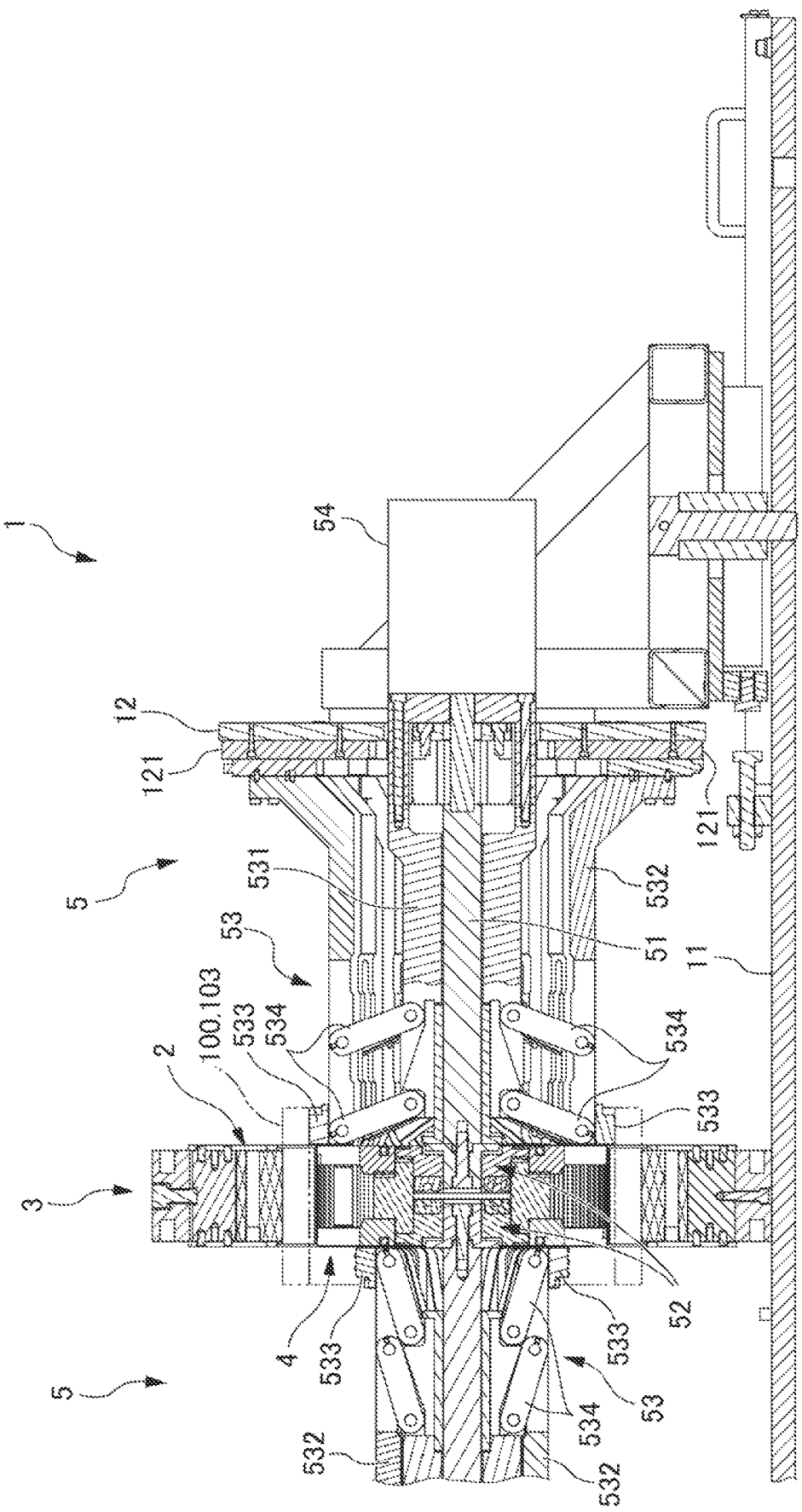
FIG. 20 is a cross-sectional side view showing an aspect in which the belt-shaped coil in the coil winding jig fixed to the stator core fixing jig is expanded in diameter by the coil expansion mechanism.
Figure 21:
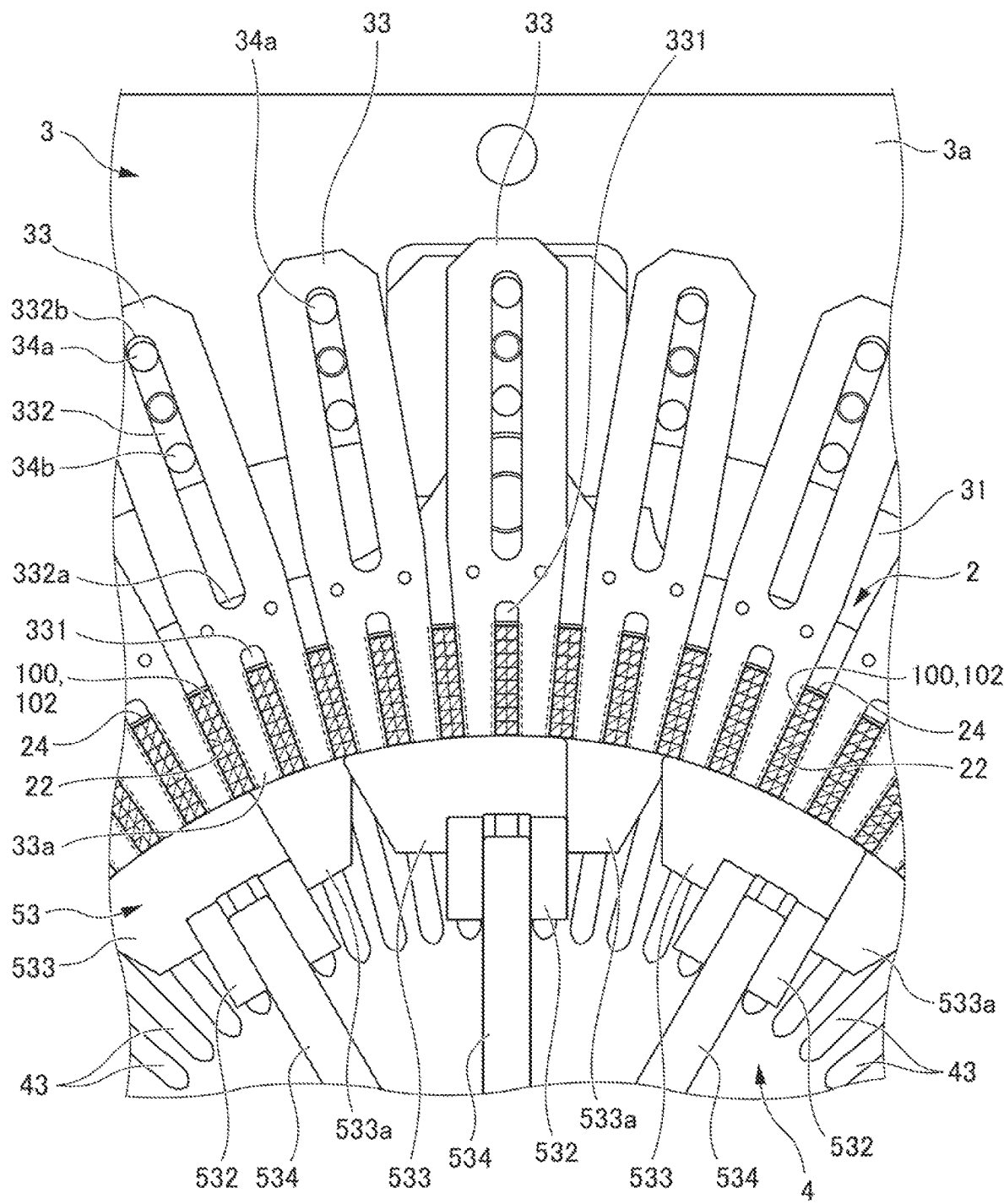
FIG. 21 is a partially enlarged view showing a state in which the belt-shaped coil pressed by the coil expansion mechanism is inserted into the slots of the stator core.

Further, after the insulating paper sheets 24 in the slots 22 are positioned by the cuff guides 33, each of the coil expanders 53 of the coil expansion mechanisms 5 is expanded in diameter by driving the actuator 54 as shown in FIGS. 20 and 21. As a result, the coil expanders 53 press the coil end portions 103 of the belt-shaped coil 100 wound around the coil winding jig 4 so as to expand the coil end portions 103 from inside toward outside with respect to the belt-shaped coil 100. The belt-shaped coil 100 pressed by the coil expanders 53 gradually expands. This expansion causes the straight portions 102 to move toward the slots 22 of the stator core 2 which communicate with the inter-comb-teeth grooves 43, while being guided by the inter-comb-teeth grooves 43. As a result, the straight portions 102 of the belt-shaped coil 100 are inserted into the slots 22 of the stator core 2 through the openings 22a of the slots 22 without interfering with the slots 22 (coil expansion step). At this time, since the insulating paper sheets 24 in the slots 22 are positioned at a predetermined position by the cuff guides 33. In addition, since the groove width of the inter-comb-teeth grooves 43 is slightly smaller than the opening width of the openings 22a of the slots 22, the straight portions 102 of the belt-shaped coil 100 can smoothly pass through the openings 22a of the slots 22, and are prevented from catching the insulating paper sheets 24.

Figure 22:
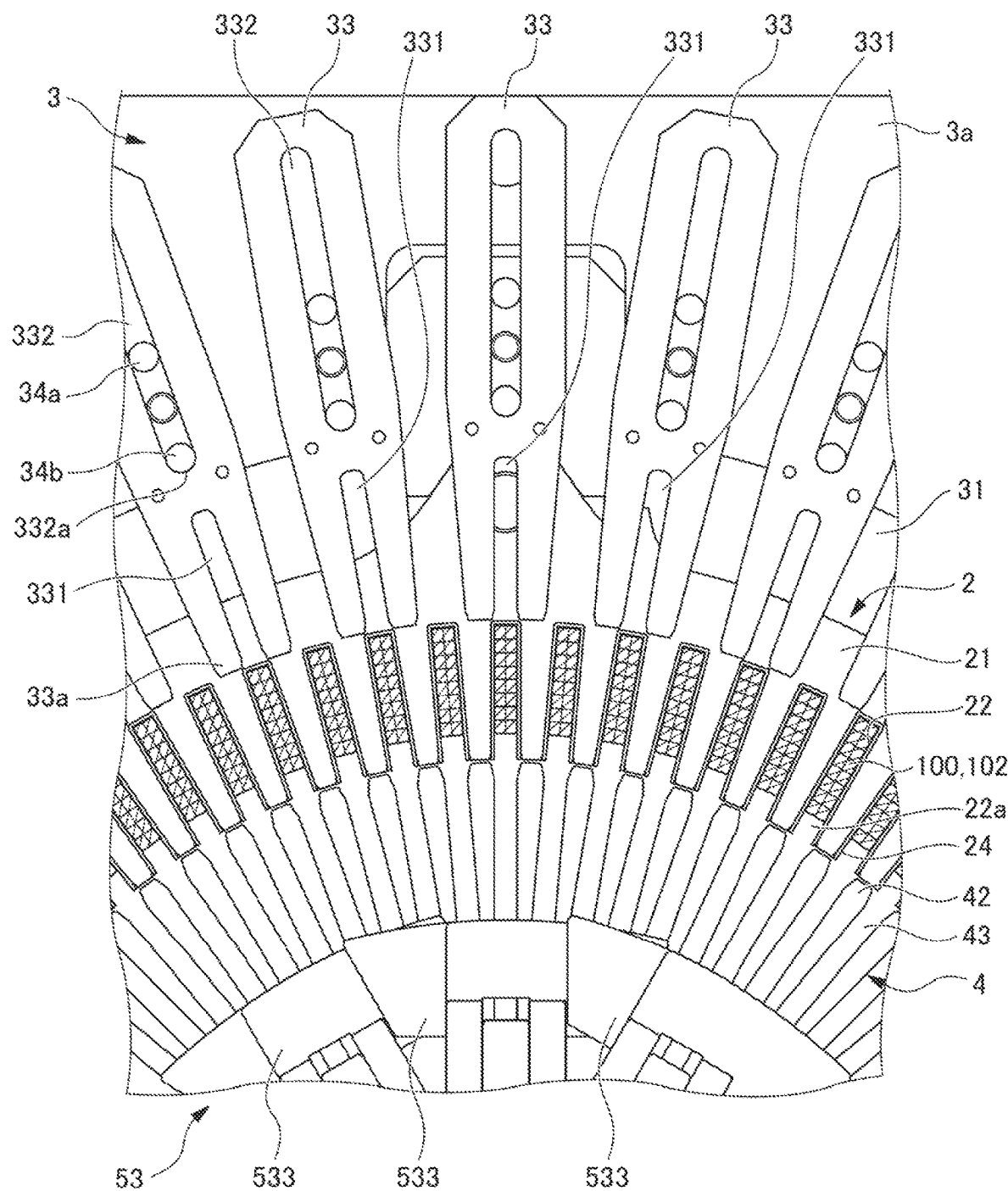
FIG. 22 is a partially enlarged view showing a state in which the cuff guides have been retracted after insertion of the belt-shaped coil into the slots.

When the coil expanders 53 of the two coil expansion mechanisms 5 are most expanded in diameter, the straight portions 102 of the belt-shaped coil 100 on the coil winding jig 4 are fully inserted into the slots 22 of the stator core 2 as shown in FIG. 22, whereby the belt-shaped coil 100 is mounted in the slots 22 of the stator core 2. The coil expanders 53 of the two coil expansion mechanisms 5 may operate so as to expand in diameter simultaneously with each other, or may operate so as to sequentially expand in diameter with a time lag so that the straight portions 102 are inserted into the openings 22a of the slots 22 obliquely with respect to the radial direction.

Figure 23:
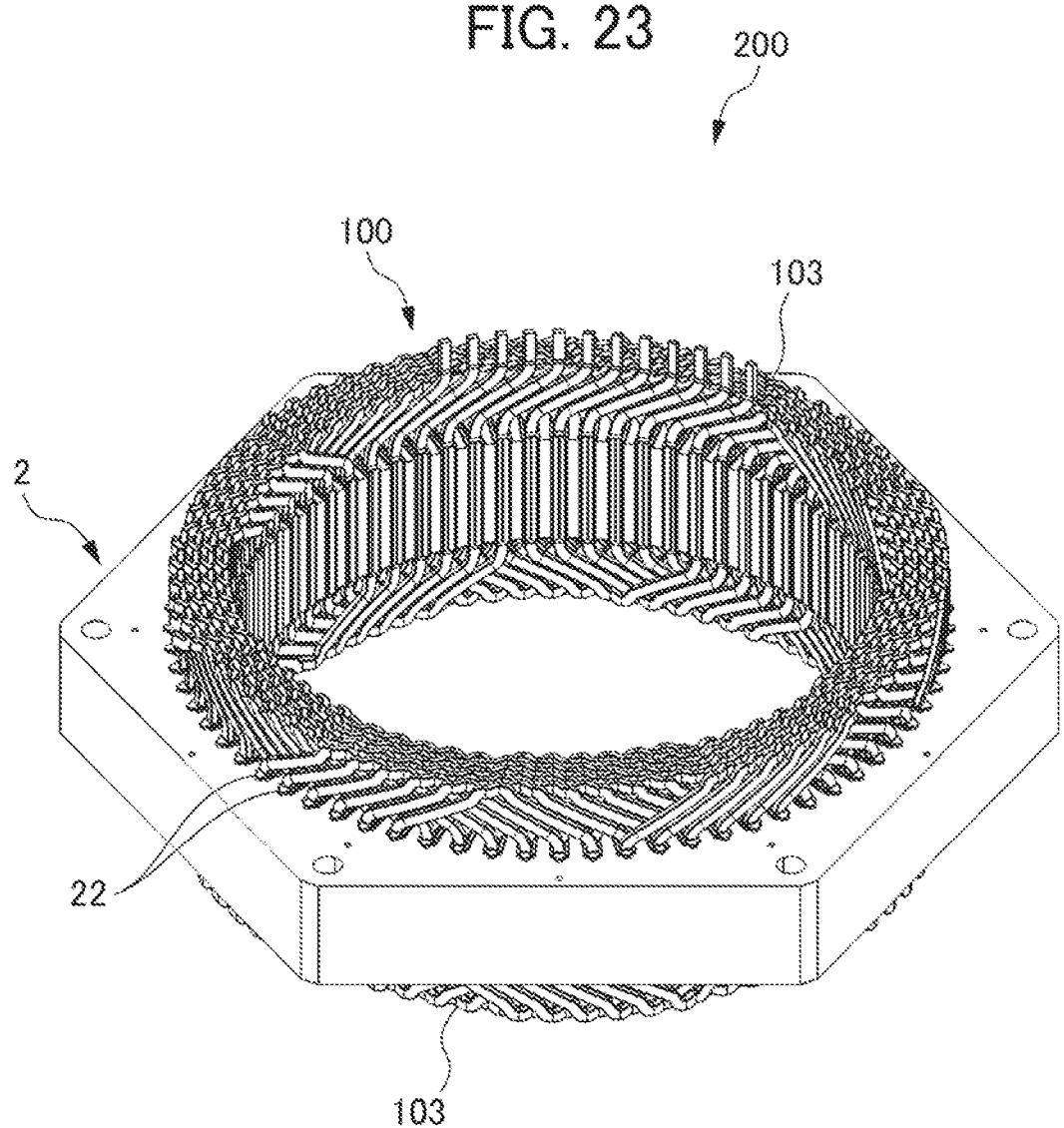
FIG. 23 is a perspective view showing a stator in which the belt-shaped coil has been mounted in the slots along the circumferential direction.

Thereafter, the cuff guides 33 move radially outward and completely retracts from the end face of the stator core 2, the coil expanders 53 both decreases in diameter, and the coil expansion mechanisms 5 are both separated from the coil winding jig 4. As a result, as shown in FIG. 23, a stator 200 including the stator core 2 that has the belt-shaped coil 100 mounted in the slots 22 of the stator core 2 is produced.

As described above, the coil mounting apparatus 1 of the present embodiment is for mounting the belt-shaped coil 100 to the stator core 2 along the circumferential direction of the stator core 2 by inserting the straight portions 102 of the belt-shaped coil 100 from the inside of the stator core 2 into the slots 22. The coil mounting apparatus 1 includes: the stator core 2; the coil winding jig 4 that has the inter-comb-teeth grooves 43 radially arranged on the outer periphery thereof, has the outer diameter smaller than the inner diameter of the stator core 2, and is configured to wind therearound the belt-shaped coil 100 in an annular shape while the straight portions 102 of the belt-shaped coil 100 are inserted into the inter-comb-teeth grooves from outside; the stator core fixing jig 3 that fixes the stator core 2 at a predetermined position and in a predetermined posture; and the coil expansion mechanism 5 that expands the belt-shaped coil 100 wound around the coil winding jig 4 from inside toward outside with respect to the belt-shaped coil 100. The coil expansion mechanism 5 includes: the holder 52 that holds the coil winding jig 4 having the belt-shaped coil 100 wound therearound inside the stator core 2 fixed to the stator core fixing jig 3 in a state where the inter-comb-teeth grooves 43 are matched in phase with the slots 22; and the coil expander 53 that presses the coil end portions 103 located nearer to a side end than the straight portions 102 of the belt-shaped coil 100 on the coil winding jig 4 held by the holder 52 so that the coil end portions 103 are expanded from inside toward outside with respect to the belt-shaped coil 100, thereby expanding the belt-shaped coil 100 to insert the straight portions 102 into the slots 22. As a result, the straight portions 102 of the belt-shaped coil 100 can be easily and reliably inserted into the slots 22 from the inside of the stator core 2 without interfering with the stator core 2 while using the inter-comb-teeth grooves 43 as a guide.

In the coil mounting apparatus 1 of the present embodiment, the coil expander 53 has the plurality of piece members 533 arranged in an annular shape around the outer periphery of the holder 52. The plurality of piece members 533 can be inserted inside the coil end portions 103 located nearer to the side end than the straight portions 102 of the belt-shaped coil 100 wound on the coil winding jig 4, and can be moved so that the distance between the adjacent piece members 533 is increased, which enables the plurality of piece members 533 to expand in diameter. As a result, the belt-shaped coil 100 can be easily expanded from inside toward outside.

In the coil mounting apparatus 1 of the present embodiment, the coil expansion mechanisms 5 are provided on both sides in the axial direction of the coil winding jig 4 held inside the stator core 2 so as to be movable in a direction in which they come into contact with the coil winding jig 4 and in a direction in which they separate from the coil winding jig 4. According to this feature, since the belt-shaped coil 100 can be expanded from both the sides in the axial direction of the coil winding jig 4, the straight portions 102 of the belt-shaped coil 100 can be efficiently inserted into the slots 22.

The coil mounting method of the present embodiment is for mounting the belt-shaped coil 100 to the stator core 2 along the circumferential direction of the stator core 2 by inserting the straight portions 102 of the belt-shaped coil 100 into the slots 22 from the inside of the stator core 2. The coil mounting method includes: the coil winding step of winding, around the coil winding jig 4 that has the inter-comb-teeth grooves 43 radially arranged on the outer periphery thereof and has the outer diameter smaller than the inner diameter of the stator core 2, the belt-shaped coil 100 in an annular shape by inserting, from outside, the straight portions 102 into the inter-comb-teeth grooves 43 of the coil winding jig 4; a coil winding jig holding step of inserting the coil winding jig 4 having the belt-shaped coil 100 wound therearound inside the stator core 2, and holding the coil winding jig 4 in a state where the inter-comb-teeth grooves 43 are matched in phase with the slots 22; and a coil expansion step of expanding the belt-shaped coil 100 by pressing the coil end portions 103 located nearer to a side end than the straight portions 102 of the belt-shaped coil 100 on the held coil winding jig 4 so that the coil end portions 103 are expanded from inside toward outside with respect to the belt-shaped coil 100, thereby inserting the straight portions 102 into the slots 22 of the stator core 2. According to this method, the straight portions 102 of the belt-shaped coil 100 can be easily and reliably inserted into the slots 22 from the inside of the stator core 2 without interfering with the stator core 2 while using the inter-comb-teeth grooves 43 as a guide.

According to the coil mounting method of the present embodiment, the coil expansion step includes inserting the plurality of annularly arranged piece members 5:33 inside the coil end portions 103 located nearer to the side end than the straight portions 102 of the belt-shaped coil 100 wound around the coil winding jig 4, and moving the piece members 533 so that the distance between the adjacent piece members 533 is increased, thereby expanding the belt-shaped coil 100. According to this feature, the belt-shaped coil 100 can be easily expanded from inside toward outside.

According to the coil mounting method of the present embodiment, the coil expansion step is performed from each of both the sides in the axial direction of the coil winding jig 4 held inside the stator core 2. According to this feature, since the coil expansion can be performed from each of both the sides of the belt-shaped coil 100, the straight portions 102 of the belt-shaped coil 100 can be efficiently inserted into the slots 22.

The coil mounting apparatus 1 of the embodiment described above is configured so that the axial directions of the stator core 2 and the coil winding jig 4 are set parallel to a horizontal direction, but it may be configured so that the axial directions of the stator core 2 and the coil winding jig 4 are set to any direction other than the horizontal direction, such as a vertical direction.

The coil winding jig 4 having the belt-shaped coil 100 annularly wound therearound may be inserted inside the stator core 2 fixed to the stator core fixing jig 3, while being held by the holder 52 of any one of the coil expansion mechanisms 5.

EXPLANATION OF REFERENCE NUMERALS

1: coil mounting device
2: stator core
22: slot
3: stator core fixing jig
4: coil winding jig
43: inter-comb-teeth groove
5: coil exp
1 expander
533: piece member
100: belt-shaped coil
102: straight portion
103: coil end portion

What is claimed is:

1. A coil mounting device for mounting a belt-shaped coil to a stator core along a circumferential direction of the stator core by inserting straight portions of the belt-shaped coil into slots from an inside of a stator core, the coil mounting device comprising:
   the stator core;
   a coil winding jig that has inter-comb-teeth grooves radially arranged on an outer periphery thereof, has an outer diameter smaller than an inner diameter of the stator core, and is configured to wind therearound the belt-shaped coil in an annular shape while the straight portions of the belt-shaped coil are inserted into the inter-comb-teeth grooves from outside;
   a stator core fixing jig that fixes the stator core at a predetermined position and in a predetermined posture; and
   a coil expansion mechanism that expands the belt-shaped coil wound around the coil winding jig from inside toward outside with respect to the belt-shaped coil,
   wherein the coil expansion mechanism comprises
   a holder that holds the coil winding jig having the belt-shaped coil wound therearound inside the stator core fixed to the stator core fixing jig in a state where the inter-comb-teeth grooves are matched in phase with the slots, and
   a coil expander that comes into contact with coil end portions of the belt-shaped coil wound around the coil winding jig held by the holder, in a circumferential direction of the coil end portions, and presses the coil end portions from inside toward outside with respect to the belt-shaped coil to expand the belt-shaped coil in diameter, thereby inserting the straight portions into the slots,
   wherein the coil expander includes a plurality of piece members arranged in an annular shape around an outer periphery of the holder,
   each of the plurality of piece members has a fitting projection and a fitting groove, wherein for each of the piece members, the fitting projection is provided on one circumferential end portion of the piece member and protruding in the circumferential direction, and the fitting groove is provided on another circumferential end portion of the piece member and is fittable to the fitting projection of an adjacent one of the piece members,
   the plurality of piece members are configured to be inserted inside the coil end portions of the belt-shaped coil wound around the coil winding jig and are configured to be moved so that the distance between the adjacent piece members is increased, whereby the plurality of piece members are expandable in diameter, and
   when the plurality of piece members are most expanded in diameter, the fitting projection of each of the piece members is positioned only partially in the fitting groove of one of the piece members adjacent in the circumferential direction, such that the adjacent piece members are continuous with each other, whereby the plurality of piece members come into contact with the coil end portions in the circumferential direction and press the coil end portions.

2. The coil mounting device according to claim 1, wherein the coil expansion mechanism comprises two coil expansion mechanisms respectively provided on both sides in an axial direction of the coil winding jig held inside the stator core, the two coil expansion mechanisms being movable in a direction in which the coil expansion mechanisms come into contact with the coil winding jig and in a direction in which the coil expansion mechanisms separate from the coil winding jig.

* * * * *